United States Patent
Jia et al.

(10) Patent No.: US 12,126,224 B2
(45) Date of Patent: Oct. 22, 2024

(54) METHOD AND APPARATUS FOR COOLING A ROTOR ASSEMBLY

(71) Applicant: GE AVIATION SYSTEMS LLC, Grand Rapids, MI (US)

(72) Inventors: Xiaochuan Jia, Dayton, OH (US); Balamurugan Sridharan, Bangalore (IN); Ami Hatim, Bangalore (IN); Anirban Chatterjee, Bangalore (IN)

(73) Assignee: GE Aviation Systems LLC, Grand Rapids, MI (US)

( * ) Notice: Subject to any disclaimer, the term of this patent is extended or adjusted under 35 U.S.C. 154(b) by 450 days.

(21) Appl. No.: 17/587,570

(22) Filed: Jan. 28, 2022

(65) Prior Publication Data
US 2023/0246500 A1   Aug. 3, 2023

(51) Int. Cl.
| | |
|---|---|
| *H02K 1/32* | (2006.01) |
| *B64D 27/10* | (2006.01) |
| *H02K 3/48* | (2006.01) |
| *H02K 5/20* | (2006.01) |
| *H02K 9/19* | (2006.01) |

(52) U.S. Cl.
CPC ............... *H02K 1/32* (2013.01); *H02K 3/48* (2013.01); *H02K 5/20* (2013.01); *H02K 9/19* (2013.01); *B64D 27/10* (2013.01)

(58) Field of Classification Search
CPC .. H02K 1/32; H02K 3/48; H02K 5/20; H02K 9/19; H02K 1/265; H02K 2201/03; H02K 3/24; H02K 1/28; H02K 3/51; H02K 5/203; B64D 27/10

USPC .......................................................... 310/52
See application file for complete search history.

(56) References Cited

U.S. PATENT DOCUMENTS

| | | |
|---|---|---|
| 3,048,725 A | 8/1962 | Wesolowski |
| 5,140,204 A | 8/1992 | Cashmore et al. |
| 5,666,016 A | 9/1997 | Cooper |
| 5,866,959 A * | 2/1999 | Le Flem ................ H02K 17/20 310/216.071 |
| 7,855,487 B2 | 12/2010 | Lemmers, Jr. et al. |

(Continued)

FOREIGN PATENT DOCUMENTS

| | | | |
|---|---|---|---|
| CN | 106787579 A | | 5/2017 |
| DE | 499422 | * | 6/1930 |

(Continued)

*Primary Examiner* — Ahmed Elnakib
(74) *Attorney, Agent, or Firm* — McGarry Bair PC

(57) ABSTRACT

A rotor assembly comprises a rotor core comprising a first end and an opposing second end, and an outwardly facing peripheral surface having a set of rotor teeth projecting outwardly therefrom to define a set of rotor slots therebetween. Each rotor tooth can comprise a first rotor tooth wall, an opposing second rotor tooth wall, and a distal tip between the first rotor tooth wall and second rotor tooth wall. Each respective rotor slot can be defined by a respective first rotor tooth wall of a first rotor tooth, and a respective second rotor tooth wall of a second rotor tooth, and includes a first rotor core conduit extending axially along a length of the first rotor tooth. The first rotor core conduit can comprise a first rotor core conduit inlet at the rotor core first end and a first rotor core conduit inlet at the rotor core second end, the rotor core conduit defining a first taper that is narrower at first rotor core conduit inlet than the first rotor core conduit outlet.

20 Claims, 13 Drawing Sheets

(56) References Cited

U.S. PATENT DOCUMENTS

| | | | |
|---|---|---|---|
| 7,902,702 | B2 | 3/2011 | Hashiba |
| 8,269,393 | B2 | 9/2012 | Patel et al. |
| 8,575,798 | B2 | 11/2013 | Takahashi et al. |
| 9,024,500 | B2 | 5/2015 | Kimura et al. |
| 9,614,407 | B2 | 4/2017 | Nishikawa |
| 10,333,365 | B2 | 6/2019 | Patel et al. |
| 10,554,088 | B2 | 2/2020 | Huang et al. |
| 2015/0249370 | A1* | 9/2015 | Wirsch, Jr. ............ H02K 3/527 310/54 |
| 2016/0149451 | A1* | 5/2016 | Teter ..................... H02K 3/24 310/54 |
| 2016/0211712 | A1 | 7/2016 | Patel et al. |
| 2016/0211713 | A1 | 7/2016 | Patel et al. |
| 2020/0212742 | A1 | 7/2020 | Sridharan et al. |
| 2023/0246500 | A1* | 8/2023 | Jia ........................ H02K 9/19 310/52 |

FOREIGN PATENT DOCUMENTS

| | | | |
|---|---|---|---|
| DE | 929566 | * | 6/1955 |
| DE | 929566 | C | 6/1955 |
| DE | 102019212391 | * | 2/2021 |
| DE | 102019212391 | A1 | 2/2021 |
| EP | 0615333 | B1 | 6/1997 |
| EP | 2811620 | A1 | 12/2014 |
| EP | 3046230 | B1 | 9/2018 |
| EP | 2568574 | B1 | 4/2019 |
| FR | 2984034 | A1 | 6/2013 |
| FR | 3079978 | A1 | 10/2019 |
| JP | S5798151 | U | 6/1982 |
| WO | 2009029743 | A1 | 3/2009 |
| WO | 2020020551 | A1 | 1/2020 |
| WO | 2020128888 | A1 | 6/2020 |
| WO | 2020191167 | A1 | 9/2020 |

* cited by examiner

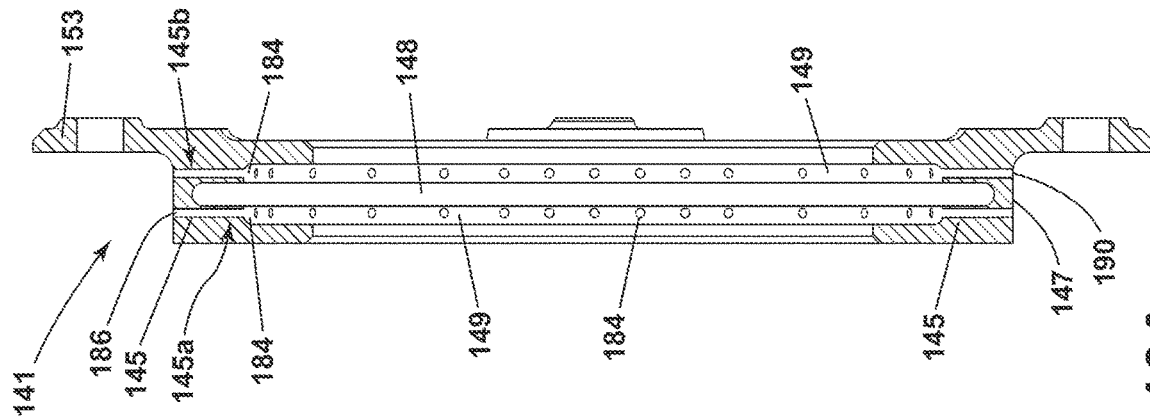
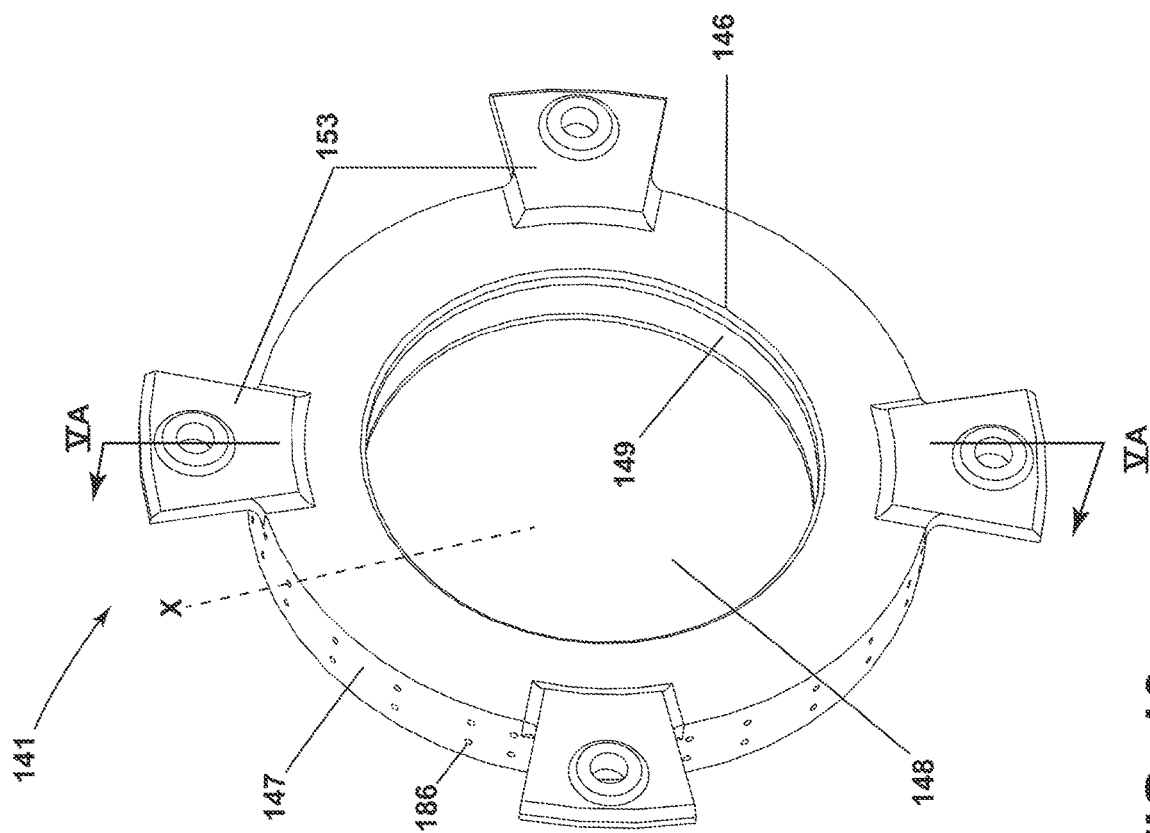
FIG. 10A
FIG. 10

METHOD AND APPARATUS FOR COOLING A ROTOR ASSEMBLY

BACKGROUND

Electric machines, such as electric motors or electric generators, are used in energy conversion. Such electrical machines operate through the interaction of magnetic fields, and current carrying conductors generate the force or electricity respectively. Typically, an electrical motor converts electrical energy into mechanical energy. Conversely, an electrical generator converts mechanical energy into electrical energy. For example, in the aircraft industry, it is common to combine a motor mode and a generator mode in the same electric machine, where the electric machine in motor mode functions to start the engine, and, depending on the mode, also functions as a generator.

Regardless of the mode, an electric machine typically defines an electromagnetic circuit having a moving portion and a stationary portion. The moving portion or rotor having rotor windings that are driven to rotate with respect to the stationary portion by a source of rotation, such as a mechanical or electrical machine, which for some aircraft may be a gas turbine.

Heat is generated in the rotor due to the flow of current through the windings, and changing magnetic fields present in the rotor, causing the temperature to rise in the rotor. It is desirable to cool the rotor to protect the electrical machine from damage and to increase the electrical machine power density to allow for more power from a smaller physically sized electric motor.

FIG. of 8 illustrates a perspective view of a portion of another aspect of a rotor assembly in accordance with various aspects described herein.

Figure 9:
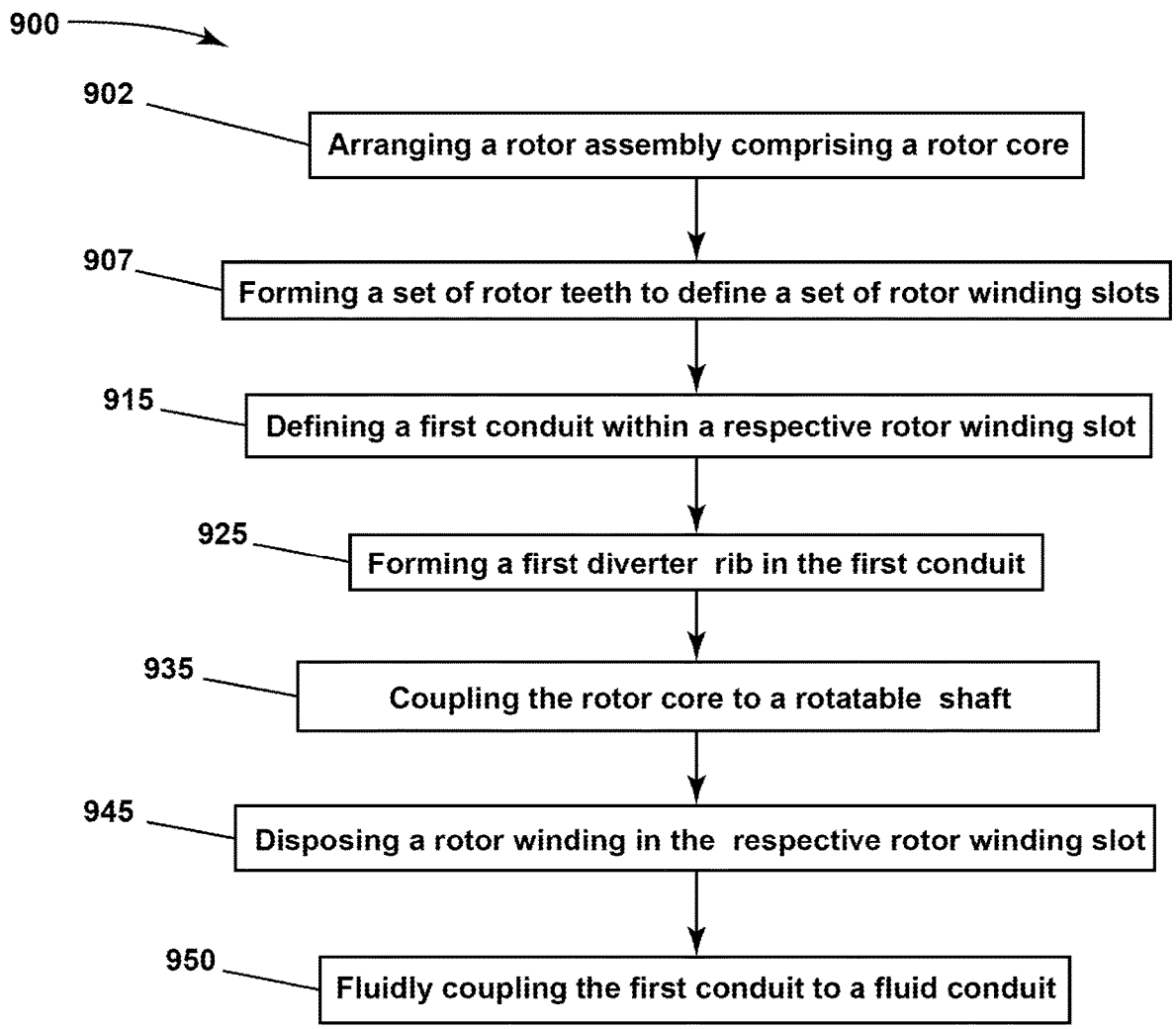

FIG. 9 illustrates an exemplary method flowchart diagram of fabricating an electric machine, in accordance with various aspects described herein.

Figure 4:
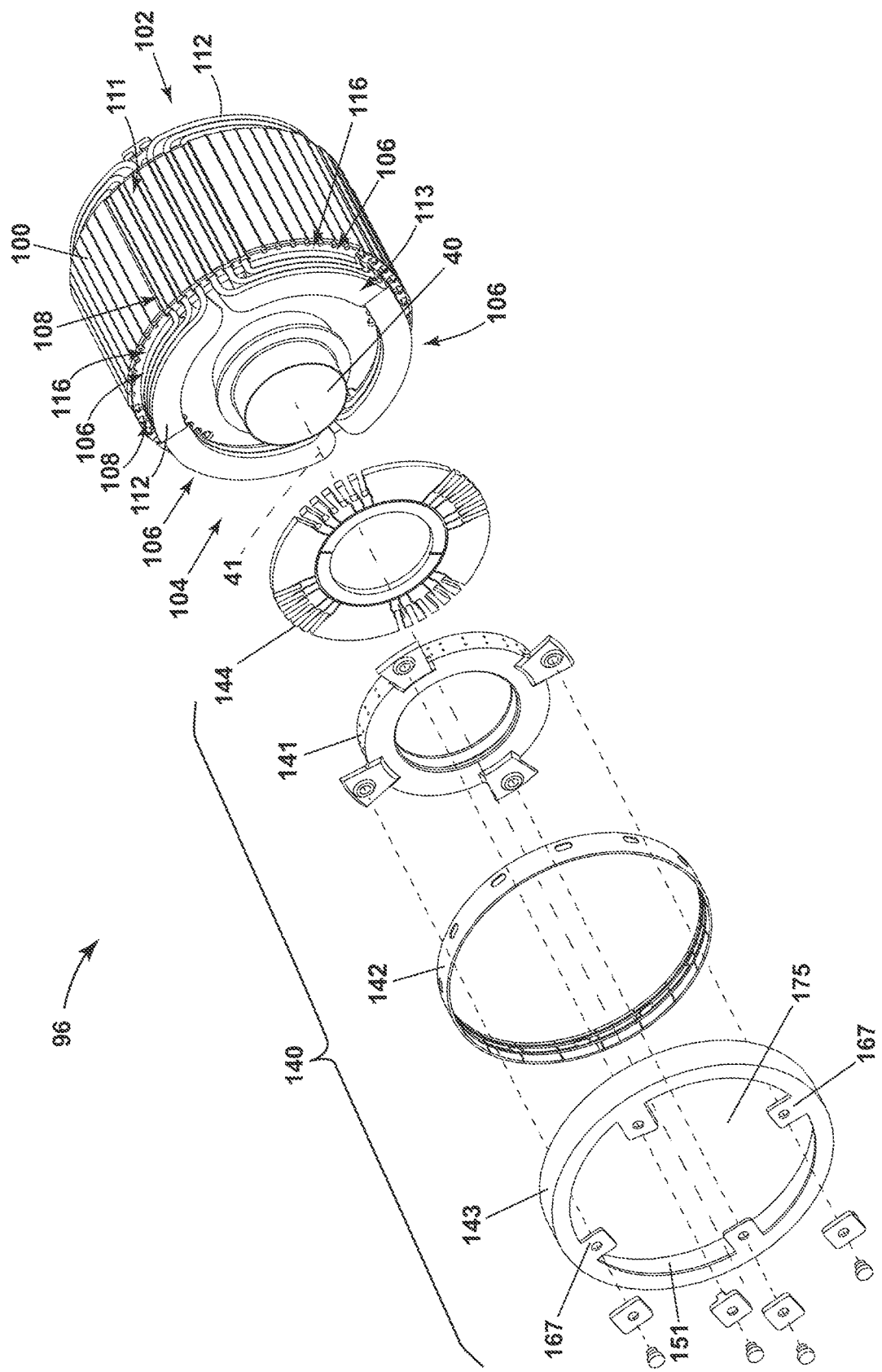
FIG. 4 illustrates a partially exploded isometric view of a rotor assembly and coil support assembly for the generator of FIG. 3, in accordance with various aspects described herein.

FIG. 10 illustrates a perspective view of the first coolant distribution ring of the rotor assembly of FIG. 4, in accordance with various aspects described herein.

FIG. 10A illustrates a cross sectional view, taken along line VA-VA of the first coolant distribution ring of FIG. 10, in accordance with various aspects described herein.

Figure 11:
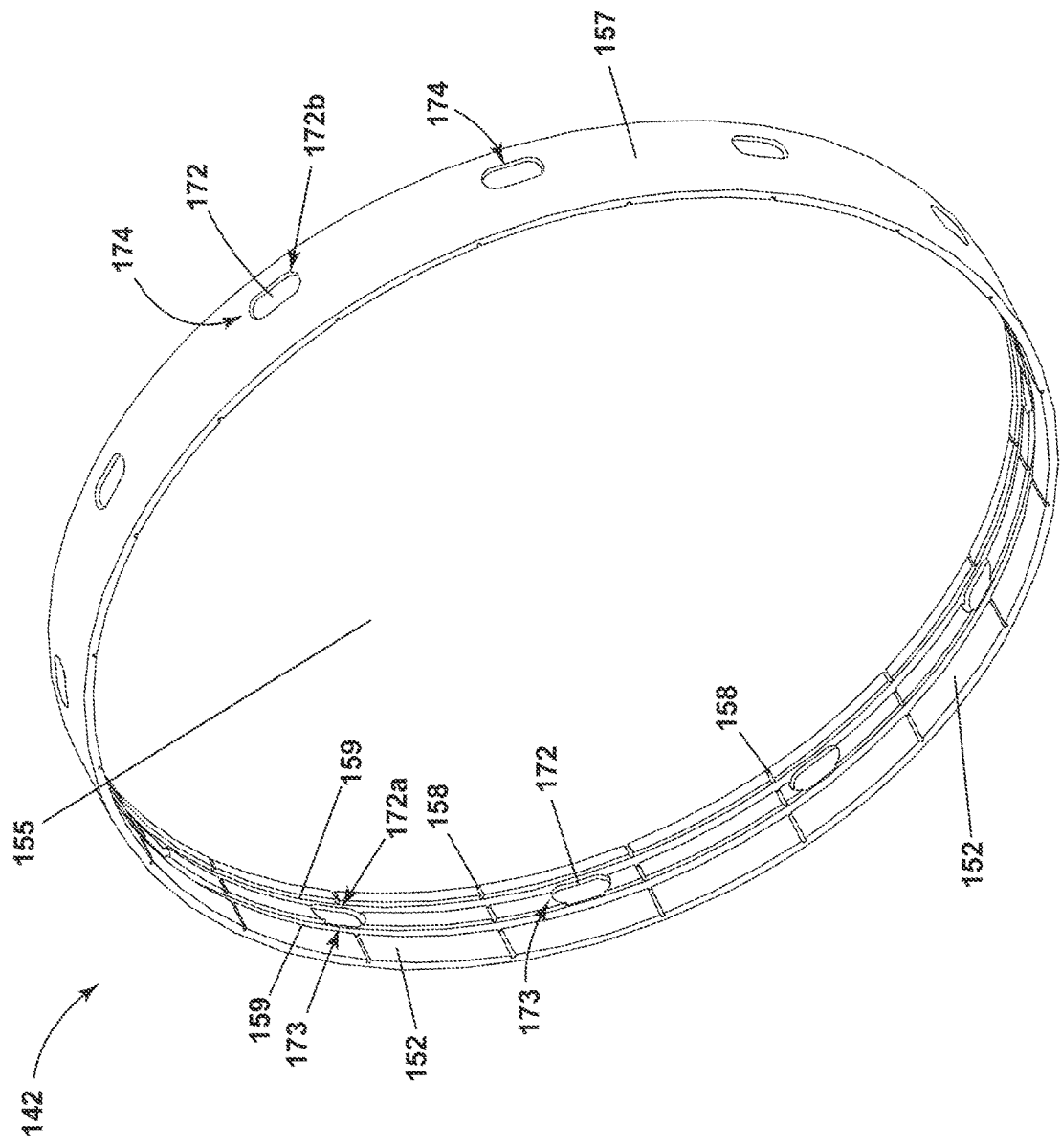

FIG. 11 illustrates a perspective view of the second coolant distribution ring of the rotor assembly of FIG. 4, in accordance with various aspects described herein.

Figure 12:
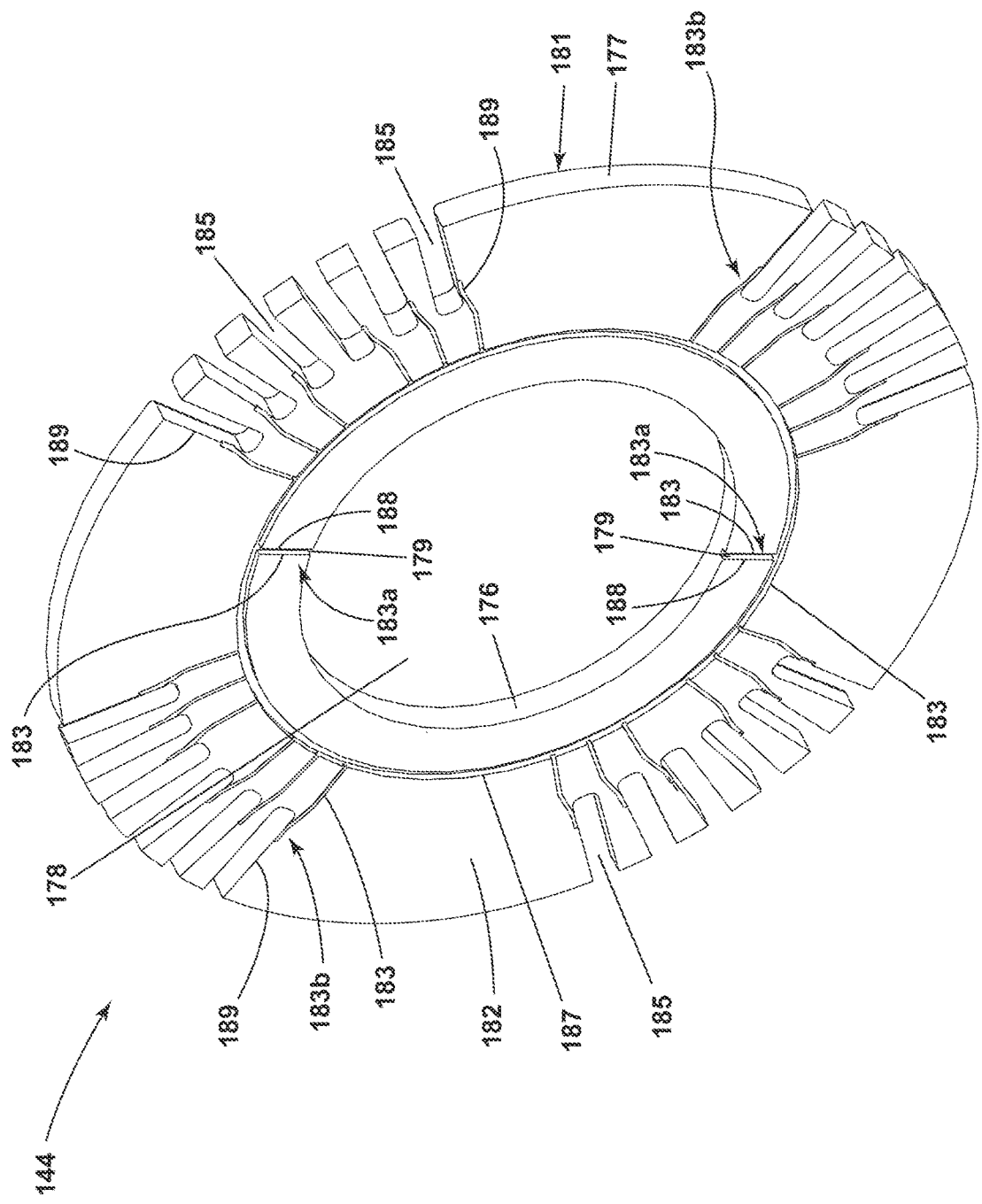

FIG. 12 illustrates a perspective view of the coil support disc of the rotor assembly of FIG. 4, in accordance with various aspects described herein.

Figure 13:
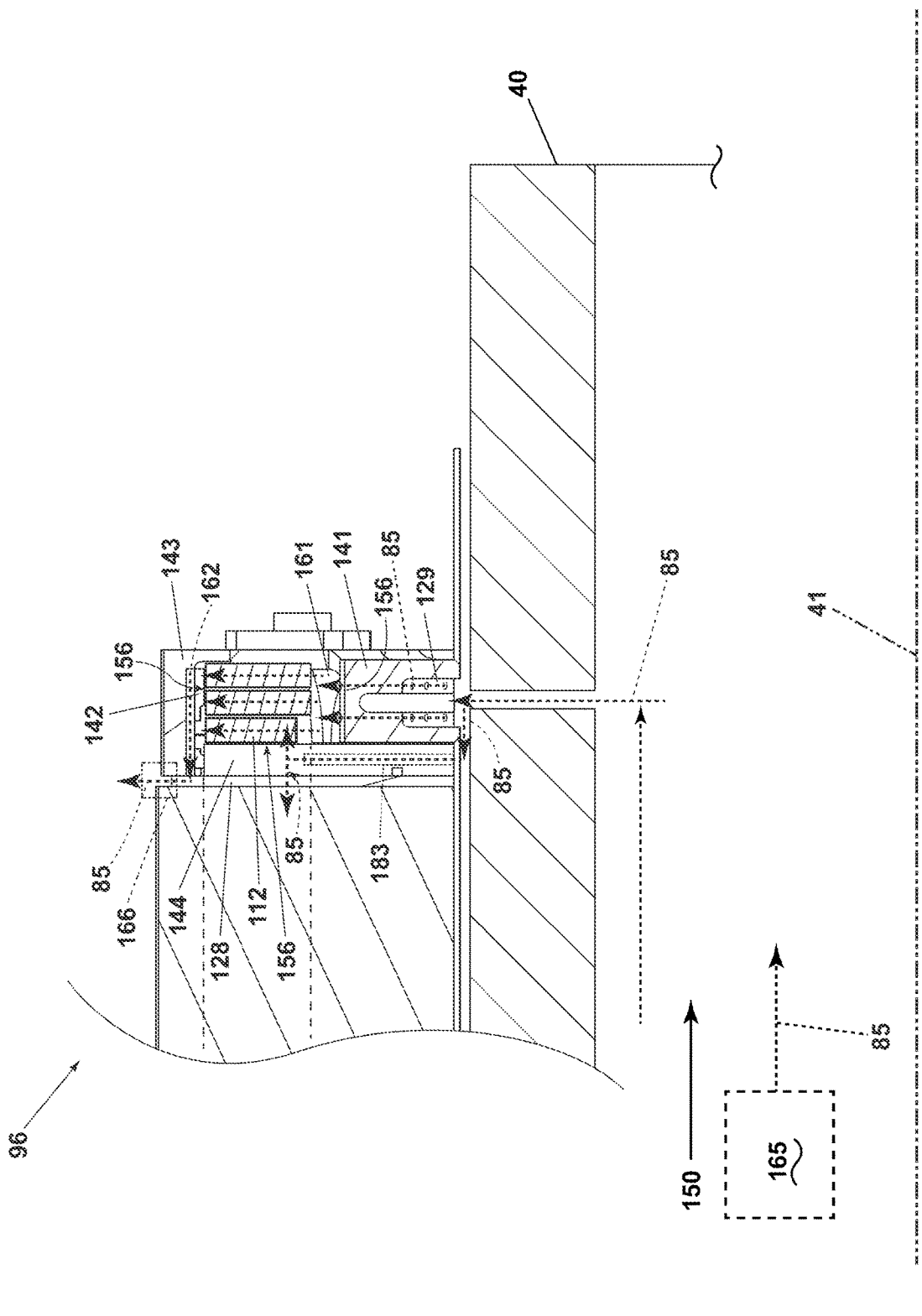

FIG. 13 illustrates a zoomed cross-sectional view of the coil support assembly of the rotor assembly of FIG. 4, in accordance with various aspects described herein.

DETAILED DESCRIPTION

Aspects of the disclosure can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

Conventional electric machines typically define an electromagnetic circuit having a moving portion and a stationary portion. The moving portion, or rotor, can include rotor windings that are driven to rotate with respect to the stationary portion by a source of rotation, such as a mechanical or electrical machine, which for some aircraft may be a gas turbine. The rotor is conventionally arranged using insulated plates or laminas (typically of iron or iron alloy) assembled or stacked together to collectively form a rotor core. In such electric machines, the rotor can be formed of a ferromagnetic material to channel magnetic flux. The stationary portion, or stator, can surround the rotor, and can comprise field magnets, such wire windings around a ferromagnetic iron core. The stator creates a magnetic field which passes through the rotor, exerting force on the rotor windings. Since the rotor core is typically formed of iron or other conductive material, it presents low resistance or low reluctance to the flow of flux, and therefore the rotor core itself contains very little magnetic energy.

Typically, an air gap must be defined between the stator and rotor to provide a clearance to enable the rotor to turn or rotate with respect to the stator. Furthermore, the air gap between the stator and rotor can configured to add reluctance to the magnetic circuit which can increase the energy storage capacity of the rotor core.

The size of the air gap between the rotor and stator can have a significant effect on the motor's electrical characteristics. Thus, for optimum machine performance, the size or width of the air gap must be carefully considered. Typically, it is desirable to have a relatively small air gap. For example, a relatively small air gap can raise the overall circuit reluctance by more than ten times. That is, a relatively small air gap can contain over ten times the magnetic energy of the iron core, which provides the flux conduit for channeling flux through the coil and concentrates the flux at the air gap. However, too small of an air gap can increase the harmonic distortion of the voltage signal on the motor windings, particularly in the vicinity of the rotor teeth forming the rotor poles. However, as size of the air gap increases, (i.e., as the reluctance of the magnetic flux path increases) the permeability of the magnetic circuit rotor-to-stator decreases, thereby decreasing the magnetizing inductance, and resulting in an increase in the required magnetizing current, thereby adding undesired heating effects to the rotor windings.

Aspects as described herein disclose an electric machine and rotor assembly, and method of making, that provides improved cooling of the rotor windings over conventional devices and methods.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "wet" cavity generator includes a cavity housing the rotor and stator that is exposed to free liquid coolant (e.g. coolant freely moving within the cavity). In contrast, a "dry" cavity generator the rotor and stator can be cooled by coolant contained within limited in fluidly sealed passages (e.g. non-freely moving about the cavity).

The exemplary drawings are for purposes of illustration only and the dimensions, positions, order and relative sizes reflected in the drawings attached hereto can vary.

Figure 1:
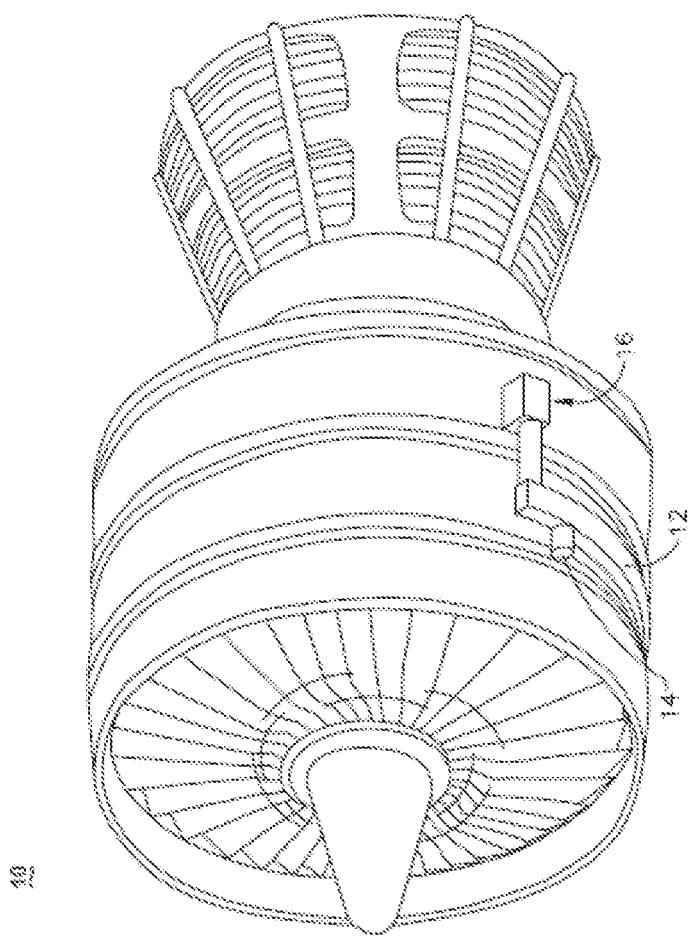
FIG. 1 is an isometric view of a gas turbine engine having a generator, in accordance with various aspects described herein.

FIG. 1 illustrates a gas turbine engine 10 having an accessory gear box (AGB) 12 and an electric machine or generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation or it could be a variety of other known gas turbine engines such as a turboprop or turboshaft. The type and specifics of the gas turbine engine 10 are not germane to the disclosure and will not be described further herein. While a generator 14 is shown and described, aspects of the disclosure are not so limited, and aspects can include any electrical machine, such as, without limitation, a motor, or generator.

Figure 2:
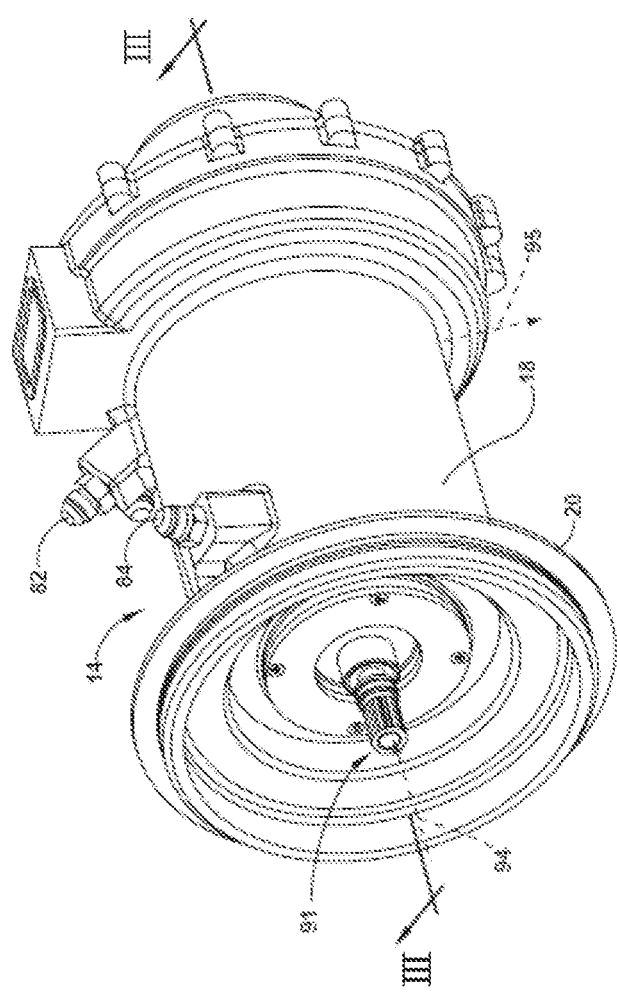
FIG. 2 is an isometric view of an exterior of the generator of FIG. 1, in accordance with various aspects described herein.

FIG. 2 more clearly illustrates a non-limiting example of the generator 14 and its housing 18 in accordance with aspects of the disclosure. The generator 14 can include a clamping interface 20, used to clamp the generator 14 to the AGB (not shown). Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 can include a liquid coolant system for cooling or dissipating heat generated by components of the generator 14 or by components proximate to the generator 14, one non-limiting example of which can be the gas turbine engine 10. For example, the generator 14 can include a liquid cooling system using oil as a coolant.

The liquid cooling system can include a cooling fluid inlet port 82 and a cooling fluid outlet port 84 for controlling the supply of coolant to the generator 14. In one non-limiting example, the cooling fluid inlet and output ports 82, 84 can be utilized for cooling at least a portion of a rotor or stator of the generator 14. The liquid cooling system can also include a second coolant outlet port 91, shown at a rotatable shaft portion of the generator 14. Optionally, by way of non-limiting example, the liquid cooling system can include a rotatable shaft coolant inlet port 94 or a generator coolant outlet port 95. While not shown, aspects of the disclosure can further include other liquid cooling system components, such as a liquid coolant reservoir fluidly coupled with the cooling fluid inlet port 82, the rotatable shaft coolant inlet port 94, the cooling fluid outlet port 84, or the generator coolant outlet port 95, and a liquid coolant pump to forcibly supply the coolant through the ports 82, 84, 94, 95 or generator 14.

Figure 3:
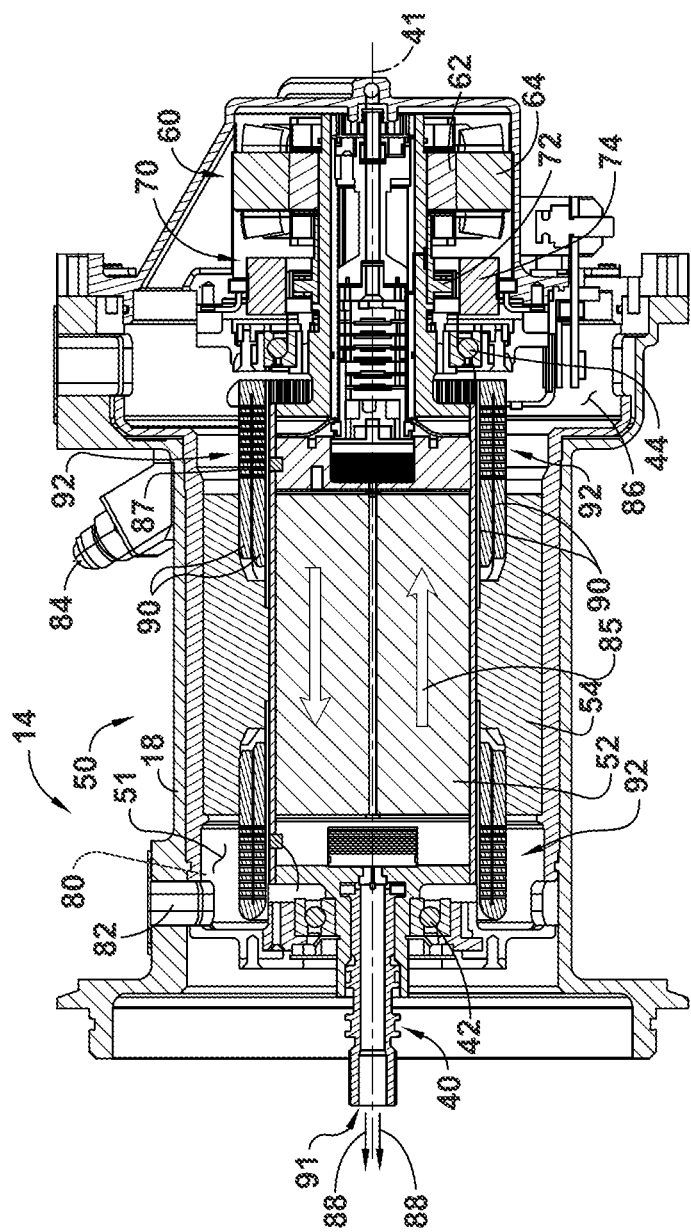
FIG. 3 is a schematic cross-sectional view of the generator of FIG. 2, taken along line of FIG. 2, in accordance with various aspects described herein.

A non-limiting interior of the generator 14 is best seen in FIG. 3, which is a cross-sectional view of the generator 14 shown in FIG. 2 taken along line A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the rotatable shaft 40. Examples of these elements can include a main machine 50, housed within a main machine cavity 51, an exciter 60, and a permanent magnet generator (PMG) 70. The corresponding rotating component comprises a main machine rotor 52, an exciter rotor 62, and a PMG rotor 72, respectively, and the corresponding fixed component comprises a main machine stator 54 or stator core, an exciter stator 64, and a PMG stator 74. In this manner, the main machine rotor 52, exciter rotor 62, and PMG rotor 72 are disposed on and co-rotate with the rotatable shaft 40. The fixed components can be mounted to any suitable part of the housing 18, and include the main machine stator 54, exciter stator 64, and PMG stator 74.

Collectively, the fixed components define an interior through which the rotatable shaft 40 extends and rotates relative thereto.

It will be understood that the main machine rotor 52, exciter rotor 62, and PMG rotor 72 can have a set of rotor poles, and that the main machine stator 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn. Aspects of the disclosure shown include at least one set of stator windings 90 arranged longitudinally along the housing 18, that is, in parallel with housing 18 and the rotational axis 41. The set of stator windings 90 can also include a set of stator winding end turns 92 extending axially beyond opposing ends of a longitudinal length of a main machine stator 54.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the generator 14 can be oil cooled and thus can include a cooling system 80. The cooling oil can be used to dissipate heat generated by the electrical and mechanical functions of the generator 14. The cooling system 80 using oil can also provide for lubrication of the generator 14. In the illustrated aspects, the generator 14 can be a liquid cooled, wet cavity cooling system 80 including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more channels or paths for coolant or fluid coolant flow 85 (shown schematically as arrows) for the main machine rotor 52, exciter rotor 62, and PMG rotor 72, as well as a rotor shaft cooling fluid outlet 88, such as the second coolant outlet port 91, wherein residual, unused, or unspent oil can be discharged from the rotatable shaft 40.

In non-limiting examples of the generator 14, the fluid coolant flow 85 can further be distributed, directed, exposed, sprayed, or otherwise deposited onto the set of stator windings 90, the set of stator winding end turns 92, or onto alternative or additional components. In this example, the fluid coolant flow 85 can flow from the rotatable shaft 40 radially outward toward the set of stator windings 90 or the set of stator winding end turns 92. In this sense, the coolant can cool the respective set of stator windings 90 or set of stator winding end turns 92.

FIG. 4 illustrates an isometric partially exploded view of a main electrodynamic machine rotor assembly 96. As shown, the rotor assembly 96 can include a rotor core 100, such as a laminated rotor core, rotatably connected to co-rotate with the rotatable shaft 40. The rotor core 100 can be formed of ferromagnetic material (for example, iron or iron alloy) to channel magnetic flux. The rotor core 100 can comprise a body 121 defining a bore 123 therethrough sized to receive the rotatable shaft 40. In non-limiting aspects the body 121 can comprise an annular or cylindrical body 121.

The rotor assembly 96 can optionally include a set of coil support assemblies 140. Each coil support assembly 140 can include a respective first coolant distribution ring 141, a second coolant distribution ring 142, and a retaining ring 143. In some non-limiting aspects, each coil support assembly 140 can further include a coil support disc 144.

The rotor assembly 96 can further define a first end 102 and a second end 104, axially spaced from the first end 102. The rotor assembly 96 can include at least one rotor pole 106. In the illustration of FIG. 4, an aspect comprising four rotor poles 106 is shown. Other aspects are not so limited, and rotor assembly 96 can alternatively have fewer than four rotor poles 106, or more than four rotor poles 106, without departing from the scope of the disclosure, and aspects can be adapted to rotor assemblies 96 having any desired number of rotor poles 106. Each rotor pole 106 can be defined by a set of conductive rotor wiring or rotor windings 110 wound about a portion of the rotor core 100. For example, in non-limiting aspects, the rotor core 100 can define a set of slots 108. In non-limiting aspects, the slots 108 can comprise a respective longitudinal axis extending axially along the rotor core 100.

The slots 108 can be circumferentially spaced from each other. In non-limiting aspects, the slots 108 can be disposed about a periphery of the rotor core 100. The slots 108 can be adapted to receive a respective rotor winding 110 therein. For example, each slot 108 can define a circumferential width and a radial depth sized to receive a respective rotor winding 110 therein.

The rotor windings 110 disposed within the slots 108 can define an axial winding portion 111 extending axially along the rotor core 100, and a set of rotor winding end turns 112 extending axially beyond the rotor core 100. In the perspective of the illustrated example, the slots 108 can underlie the set of rotor windings 110. While the rotor windings 110 or the rotor winding end turns 112 can refer to a set of or plural windings or end turns, an end turn can include only one of the set of rotor windings 110, or only one portion of the set of rotor windings 110 extending axially beyond the rotor core 100, such as only at the first end 102 or the second end 104.

The set of rotor winding end turns 112 can define respective loops or arcuate bight portions 113 disposed axially beyond the rotor core 100. In non-limiting aspects, each bight portion 113 can define a respective channel 116 extending therethrough. For example, in non-limiting aspects each respective channel 116 can have a width defined by a width and spacing between the slots 108.

In non-limiting aspects, the coil support assembly 140 can be disposed at either end 102, 104 of the rotor assembly 96. For example, in some aspects, a single coil support assembly 140 can be disposed at one end of the rotor assembly 96. In other non-limiting aspects, a respective coil support assembly 140 can be disposed at each end of the rotor assembly 96.

A respective coil support assembly 140 can be fixedly coupled to each end of the rotatable shaft 40 of the rotor assembly 96. For example, a respective coil support assembly 140 can be coupled to one end (e.g., the first end 102 or the second end 104) of the rotor assembly 96. In other aspects, a respective coil support assembly 140 can be coupled to the rotatable shaft 40 at both the first end 102 and the second end 104 of the rotor assembly 96.

Figure 5:
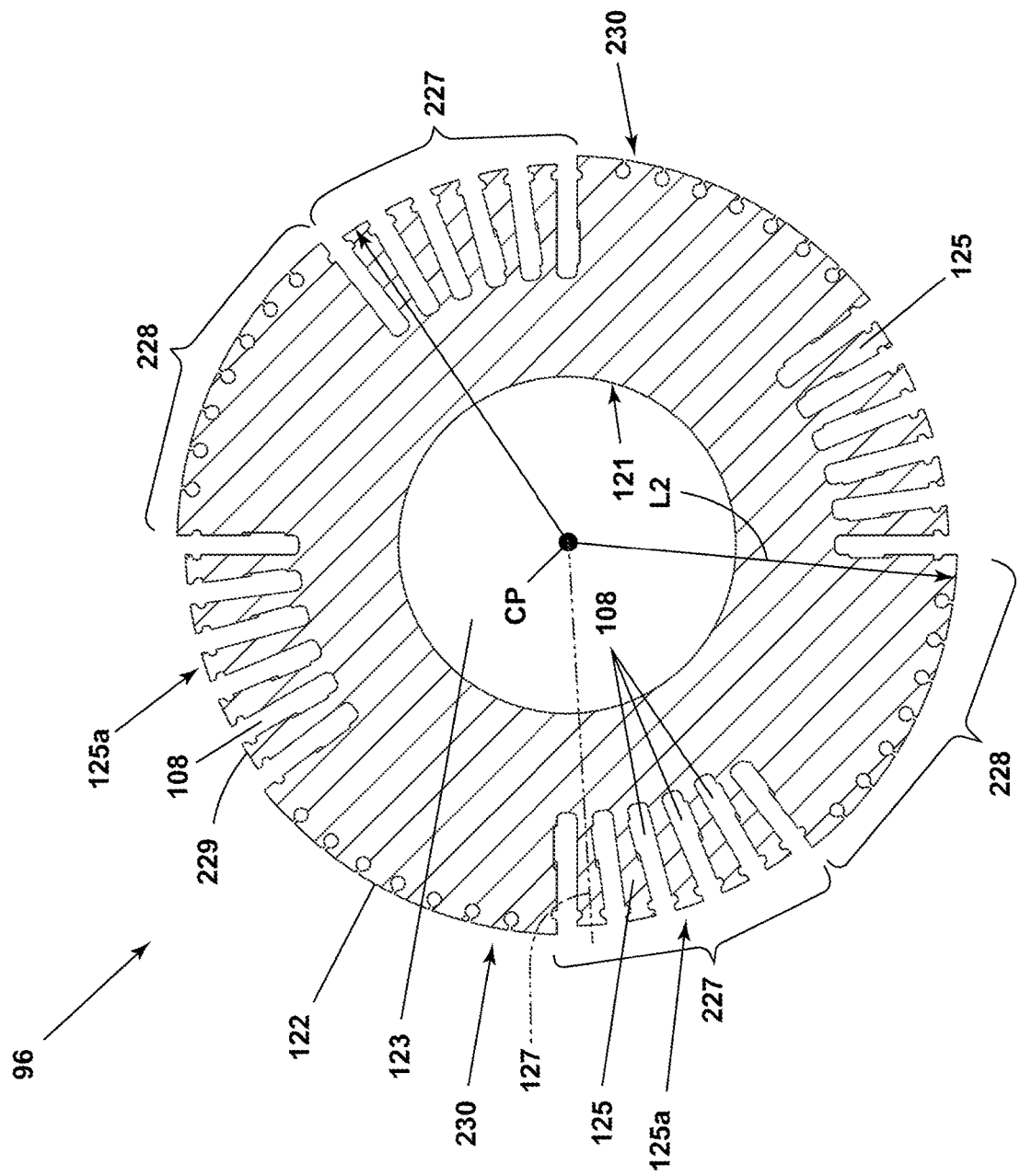
FIG. 5 illustrates a simplified cross-sectional end view of the rotor assembly of FIG. 4, with parts omitted for clarity, in accordance with various aspects described herein.

FIG. 5 depicts a simplified end view of the rotor core 100 with the rotor windings 110 and other parts omitted for ease of description and understanding. As shown, the rotor core 100 can include a set of rotor teeth 125 extending therefrom, for example along a circumferential outward facing or peripheral surface 230 of the rotor core 100. The peripheral surface 230 can define an axial length extending between the first end 102 and second end 104 of the rotor assembly 96. Each rotor tooth 125 can comprise a longitudinal axis 127. Each rotor tooth 125 can comprise a respective first distal tip 125a defined at the radial extent of the rotor tooth 125. Each rotor tooth 125 can define a respective radial length L1, extending radially (e.g., along the longitudinal axis 127) from a central axis (designated "CP") of the rotor core 100 to the distal or peripheral tip of the respective rotor tooth 125. For example, in non-limiting aspects, the central axis CP can be defined by an intersection of the rotational axis 41 of the rotatable shaft 40 and the longitudinal axis 127 of a respective tooth 125. In non-limiting aspects, each rotor tooth 125 can have the same length such that the respective radial length L1 of each rotor tooth 125 can be identical. In non-limiting aspects, the set of rotor teeth 125 can be circumferentially spaced from each other about the rotor core 100 to define the slots 108 therebetween. In non-limiting aspects, each rotor tooth 125 can be arranged between two immediately adjacent slots 108.

In non-limiting aspects, the rotor core 100 can include a set of slotted portions 227 and a set of non-slotted portions 228. Each slotted portion 227 can be defined by a respective subset of the set of rotor teeth 125 and comprise the slots 108 sized to receive a respective rotor winding 110 therein. As illustrated, in non-limiting aspects, each slot 108 can be defined between a first rotor tooth 125 and one of a second rotor tooth 125 and a non-slotted portion 227.

In non-limiting aspects, the number of slotted portions 227 can correspond to the number of rotor poles 106 of the rotor core 100. It will be appreciated that each slotted portion 227 can comprise a respective radial length corresponds to, or is equal to, a respective radial length L1 of the rotor teeth 125 forming the respective slotted portion 227. In non-limiting aspects, the non-slotted portion 228 can define a respective second radial length L2, extending radially from the central axis CP of the rotor core 100 to a peripheral tip 231 of the non-slotted portion 228 at the peripheral surface 230 of the rotor core 100. In non-limiting aspects, the radial length L1 defined by the slotted portion 227 is less than the radial length defined by the non-slotted portion 228. In this way, non-limiting aspects of the rotor 100 can define a first diameter D1 with respect to at least one slotted portion 227, and a second diameter D2 with respect to at least on non-slotted portion 228. In some aspects, the first diameter D1 can be less than the second diameter D2.

In the non-limiting aspect illustrated, the rotor core 100 is a four-pole type rotor core, with each pole 106 comprising a respective a slotted portion 227 of the rotor core 100. It will be appreciated that aspects as disclosed herein are not limited to any specific number of rotor poles, and other aspects can be adapted to rotor assemblies 96 having any desired number of rotor poles 106.

Figure 6:
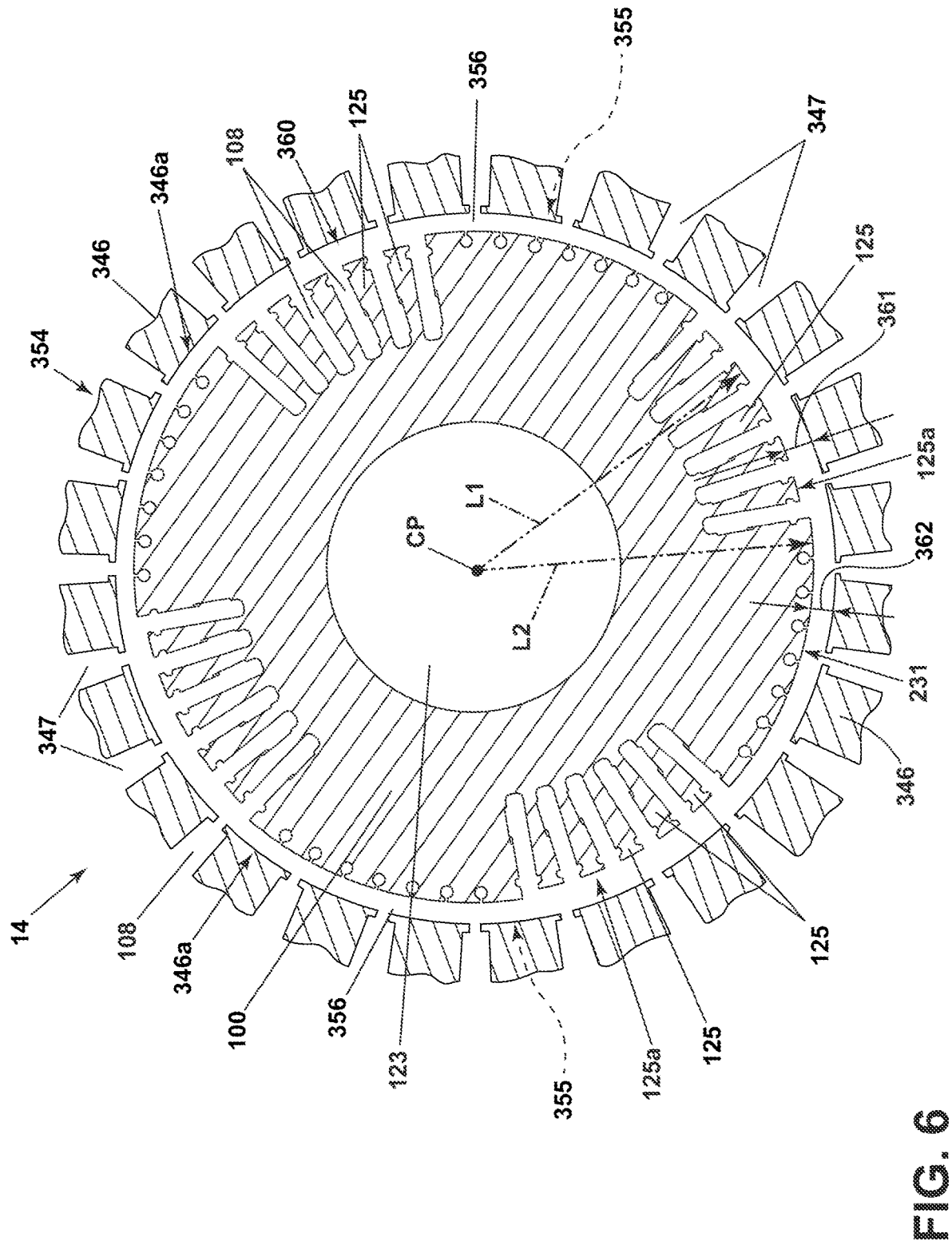
FIG. 6 illustrates simplified cross-sectional end view of an electric machine in accordance with non-limiting aspects described herein.

A non-limiting aspect of a portion of the electric machine 14 is depicted in simplified cross-sectional end view in FIG. 6 with parts omitted (e.g., the rotor and stator windings) for ease of description and understanding.

In aspects, a stator core 354 can comprise an inwardly facing surface 355 defining a bore 356. For example, in non-limiting aspects, the inwardly facing surface can comprise an inward facing extent of the stator core 354. The rotor core 100 is sized to be rotatably disposed or received within the bore 356. A set of inwardly facing stator teeth 346 can be can be evenly spaced about the inwardly facing surface 355 to define a set of stator slots 347 therebetween. Each stator tooth 346 can comprise a respective second distal tip 346a defined at the radially inwardly facing extent of the stator tooth 346. As illustrated, each first distal tip 125a of the set of rotor teeth 125 can rotatably oppose a respective second distal tip 346a of the set of stator teeth 346.

In non-limiting aspects, as shown, air gap 360 can be defined between the rotor core 100 and the stator core 354. The air gap 360 can define a first radial width 361 defined between a respective slotted portion 227 of the rotor core 100, and the inwardly facing surface 355 of the stator core 354. For example, the first radial width 361 can be measured between the first distal tip 125a of a respective rotor tooth 125 at a slotted portion 227 of the rotor core 100, and an opposing second distal tip 346a of an opposing stator tooth 346 at the inwardly facing surface 355 of the stator core 354. In non-limiting aspects, the first radial width 361 can extend along the longitudinal length of the rotor core 100. In non-limiting aspects, the air gap 360 can further define a second radial width 362 defined between a respective non-slotted portion 228 of the rotor core 100 and the inwardly facing surface 355 of the stator core 354. For example, the second radial width 362 can be measured between the first distal tip 125a of a respective rotor tooth 125 at a slotted portion 227 of the rotor core 100, and an opposing second distal tip 346a of an opposing stator tooth 346 at the inwardly facing surface 355 of the stator core 354.

In non-limiting aspects, the second radial width 362 can extend along the longitudinal length of the rotor core 100. In aspects the first radial width 361, can be wider than the second radial width 362. For example, in non-limiting aspects, the respective first radial length L1 of each rotor tooth 125 in a respective slotted portion 227 can be less than the second radial length L2 of the non-slotted portion 228. In such aspects, the arrangement of the first radial width 361 being larger or wider than the second radial width 362 has the particular purpose of influencing the reluctance of a flux path between the rotor core 100 and stator core. In operation, the first radial width 361 of the air gap 360 being wider than the second radial width 362 enables an improved distribution of the magnetic flux along the flux path between the rotor and stator thereby resulting in a reduction in the harmonic distortion of the voltage waveform.

In some aspects, the wider first radial width 361, relative to the second radial width 362, will increase the rotor reluctance in the vicinity of the rotor teeth 125. This can cause an increase in the magnetizing current, with a consequent increase in heating effects. As will be described in more detail herein, in non-limiting aspects, additional cooling can be applied using the fluid coolant flow 85 via a set of rotor core conduits 500 defined in the rotor 100.

Figure 7:
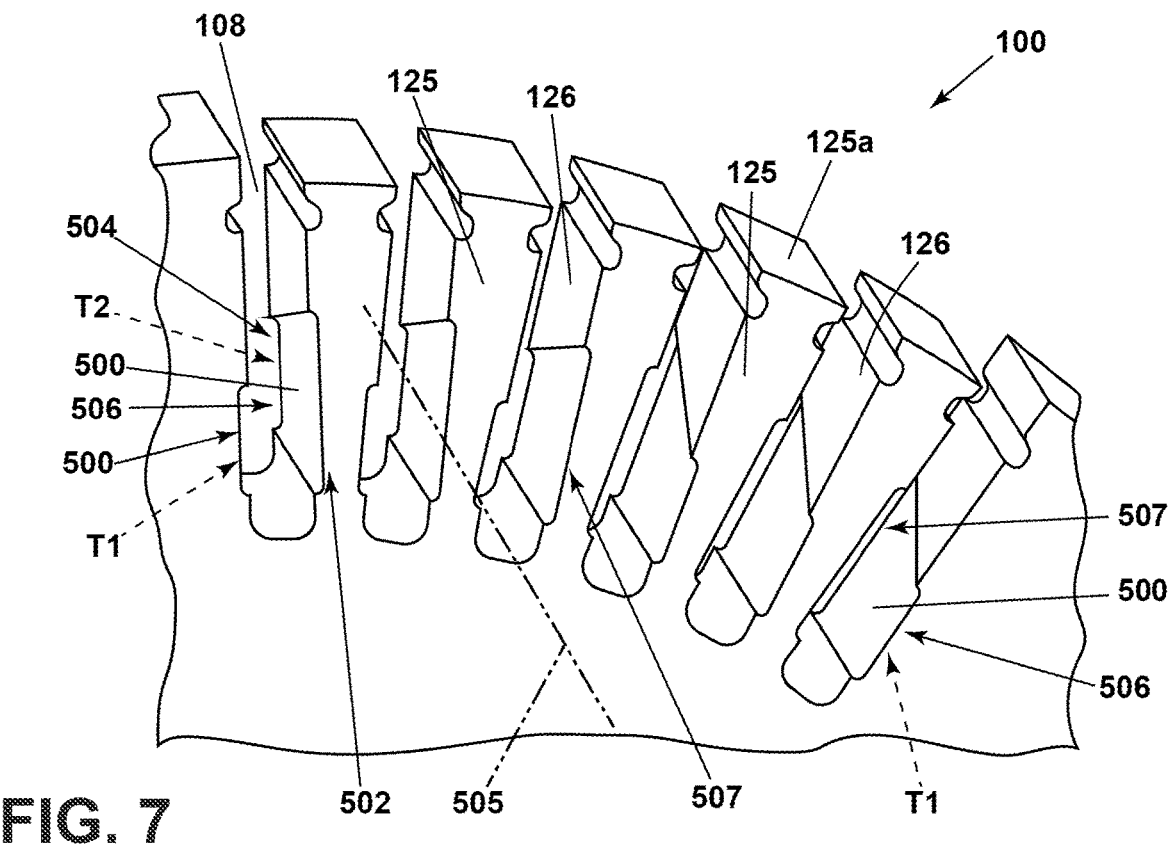
FIG. 7 illustrates a perspective view of a portion of a non-limiting rotor assembly in accordance with various aspects described herein.
Figure 7A:
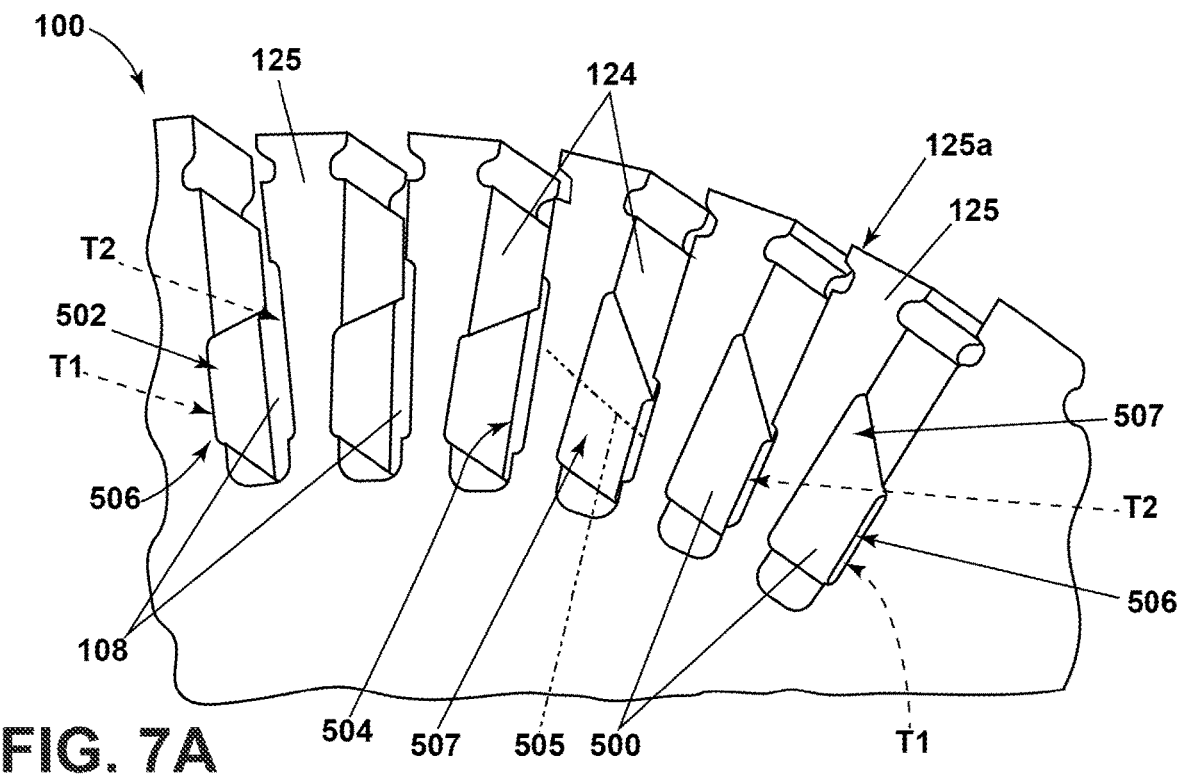
FIG. 7A illustrates rotor assembly of FIG. 7 viewed from a different perspective, in accordance with various aspects described herein.

FIG. 7 illustrates a non-limiting aspect of a portion of the rotor core 100 comprising the set of rotor core conduits 500, with some parts, such as the rotor windings 110 omitted for clarity. The rotor core conduits 500 can be defined within at least a subset of the slots 108 and arranged in thermal communication with the rotor windings 110 disposed therein. For example, the rotor core conduits 500 can be defined on the rotor teeth 125 forming a particular slot 108. It will be appreciated that the rotor winding 110 disposed in the slot 108 can enclose or partially define the rotor core conduit 500.

For example, it can be seen that each rotor tooth 125 can comprise a respective first rotor tooth wall 124 and a respective second rotor tooth wall 126. The respective first distal tip 125a can be disposed between the first rotor tooth wall 124 and the second rotor tooth wall 126. For example, in non-limiting aspects a respective first distal tip 125a can couple a corresponding first rotor tooth wall 124 and second rotor tooth wall 126. In aspects, the first rotor tooth wall 124 and second rotor tooth wall 126 can face in opposite directions from each other such that a first rotor tooth wall 124 of a first rotor tooth 125 can oppose a second rotor tooth wall 126 of a rotor second tooth 125. At least a subset of the slots 108 can be defined between two immediately adjacent rotor teeth 125. For example, a particular slot 108 can be defined between a first rotor tooth wall 124 of a first rotor tooth 125, and an opposing second rotor tooth wall 126 of a second rotor tooth 125.

In non-limiting aspects, at least a subset of the first rotor tooth walls 124 can comprise a respective rotor core conduit 500 defined therein. Similarly, in other aspects, at least a subset of the second rotor tooth walls 126 can comprise a respective rotor core conduit 500 defined therein. In still other aspects, at least a subset of both the first rotor tooth walls 124 and second rotor tooth walls 126 can each comprise a respective rotor core conduit 500 defined therein. In some aspects, the rotor core conduits 500 can be defined by a notch 505 defined in a respective rotor tooth 125. In non-limiting aspects, the notch 505 can define a U-shape. The notch 505 can comprise a first wall 515 and an opposing second wall 516. In non-limiting aspects, the first wall 515 can be disposed radially inward with respect to the second wall 516. The notch 505 can further comprise a third radially extending wall disposed between and coupling the first wall 515 and second wall 516. For example, in non-limiting aspects, the notch 505 can be formed or defined by removing material from the rotor core via a conventional electric discharge machining (EDM) process.

In non-limiting aspects, the rotor core conduits 500 can be generally elongate. In some aspects, each rotor core conduit 500 can define a respective longitudinal axis 505a extending along the axial length of the rotor core 100. For example, in non-limiting aspects, the rotor core conduits 500 can extend between the rotor core first end 102 and the rotor core second end 104. Each rotor core conduit 500 can further define a respective rotor core conduit first end 502 and a respective rotor core conduit second end 504, axially spaced from the rotor core conduit first end 502. For example, in some aspects, the rotor core conduit first end 502 and rotor core conduit second end 504 can correspond to the rotor assembly 96 first end 102 and second end 104, respectively. For example, in non-limiting aspects, each conduit 500 can comprise a rotor core conduit first end 502 defining a rotor core conduit inlet 506, disposed at the rotor core first end 102, and a rotor core conduit second end 504 defining a rotor core conduit outlet 507 disposed at the rotor core second end 104. The rotor core conduit inlet 506 and rotor core conduit outlet 507 can be arranged in fluid communication with the source of coolant (not shown) to receive and to expel, respectively, the fluid coolant flow 85. The direction or location of the source of coolant is not limited by the illustration and can be considered in any location that is fluidly coupled to the rotor core conduits 500. It is further considered that additional conduit, pumps, valves, or other devices can be included to fluidly connect the source of coolant and the rotor core conduit 500.

For example, as will be described in more detail herein, coolant fluid can enter the rotatable shaft 40 of the rotor assembly 96 via an inlet port. The rotatable shaft 40 at least in part, can define a coolant conduit, through which fluid can flow radially outward due to the centrifugal force effects of the rotatable shaft 40. A coolant passage can extend radially through the rotatable shaft 40, and can fluidly couple the rotatable shaft 40 and the first coolant distribution ring 141, the winding end turns 112, the second coolant distribution ring 142, the coil support disc 144, and various combinations thereof, which can be in further fluid communication with the rotor core conduits 500 individually or in combination.

In some non-limiting aspects, the rotor core conduits 500 can be tapered along an axial length of the rotor core conduit 500. For example, in non-limiting aspects, a particular rotor core conduit 500 can define a first taper T1 that is narrower at the rotor core conduit first end 502 with respect to the rotor core conduit second end 504. In such aspects, the rotor core conduit inlet 506 can be disposed at the respective rotor core conduit first end 502. Alternatively, in some aspects a particular rotor core conduit 500 can define a second taper T2 that is narrow at the rotor core conduit second end 504 with respect to the rotor core conduit first end 502. In such aspects, the rotor core conduit inlet 506 can be disposed at the respective rotor core conduit second end 504 of the rotor core conduit 500. In this way, in non-limiting aspects, the rotor core conduit inlet 506 can be disposed at the narrowest end of each respective rotor core conduit 500, and the rotor core conduit outlet 507 can be disposed at the widest end of each respective rotor core conduit 500. In non-limiting aspects, the notch 505 can be defined as one of a cone shape, conical frustum shape, and trapezoidal prism shape.

In some aspects, the first taper T1 and second taper T2 can be defined by the respective orientation of the first wall 515 relative to the second wall 516. For example, in non-limiting aspects the first wall 515 can be arranged to extend axially along the length of the rotor core 100, parallel to the rotational axis 41 of the rotatable shaft 40, while the second wall 516 can be arranged to extend axially along the length of the rotor core 100 at a non-parallel, non-orthogonal angle with respect to the first wall 515 to form the desired first taper T1 or second taper T2. In other aspects, both the first wall 515 and second wall 516 can be arranged at a non-parallel, non-orthogonal angle with respect to each other, and with respect to the rotational axis 41 of the rotatable shaft 40 to form the desired first taper T1 or second taper T2.

In some aspects, each rotor core conduit 500 can comprise the first taper T1. In other aspects each rotor core conduit 500 can comprise the second taper T2. In still other aspects, as illustrated, a first subset of the rotor core conduits 500 can comprise the first taper T1, and a second subset of the rotor core conduits 500 can comprise the second taper T2. In some aspects, the relative taper of each rotor core conduit 500 can be identical in each slot 108. In other aspects, the relative taper of each rotor core conduit 500 can be alternated in adjacent slots 108.

In one non-limiting example, for a particular slot 108, being defined between a first rotor tooth 125 and an immediately adjacent second rotor tooth 125, a first rotor core conduit 500 can be defined on the first rotor tooth wall 124 of the first rotor tooth 125, and a second rotor core conduit 500 can be defined on the second rotor tooth wall 126 of the second rotor tooth 125, wherein both the first and second rotor core conduits 500 in the particular slot 108 can comprise one of the first taper T1, and the second taper T2.

In other aspects, the relative taper of each rotor core conduit 500 can be alternated. For example, for a particular slot 108, being defined between a first rotor tooth 125 and an immediately adjacent second rotor tooth 125, a first rotor core conduit 500 can be defined on the first rotor tooth wall 124 of the first rotor tooth 125 comprising the first taper T1, and a second rotor core conduit 500 can be defined on the opposing second rotor tooth wall 126 of the second rotor tooth 125 comprising the second taper T2. In this way, the fluid coolant flow 85 received from a first coolant conduit (not shown) of the electric machine 14 can be directed in first axial direction in the first rotor core conduit 500 (from the relatively narrow end of the respective rotor core conduit inlet 506 to the relatively wide end of the respective rotor core conduit outlet 507), and directed in a second axial direction opposite the first direction in the second rotor core conduit 500 (from the relatively narrow end of the respective rotor core conduit inlet 506 to the relatively wide end of the rotor core conduit outlet 507). Other aspects are not so limited, and any number of rotor core conduits 500 can be defined on any number of rotor teeth 125 having any desired taper T1, T2 between the respective rotor core conduit inlet 506 and the respective rotor core conduit outlet 507, without departing from the scope of the disclosure.

Figure 8:
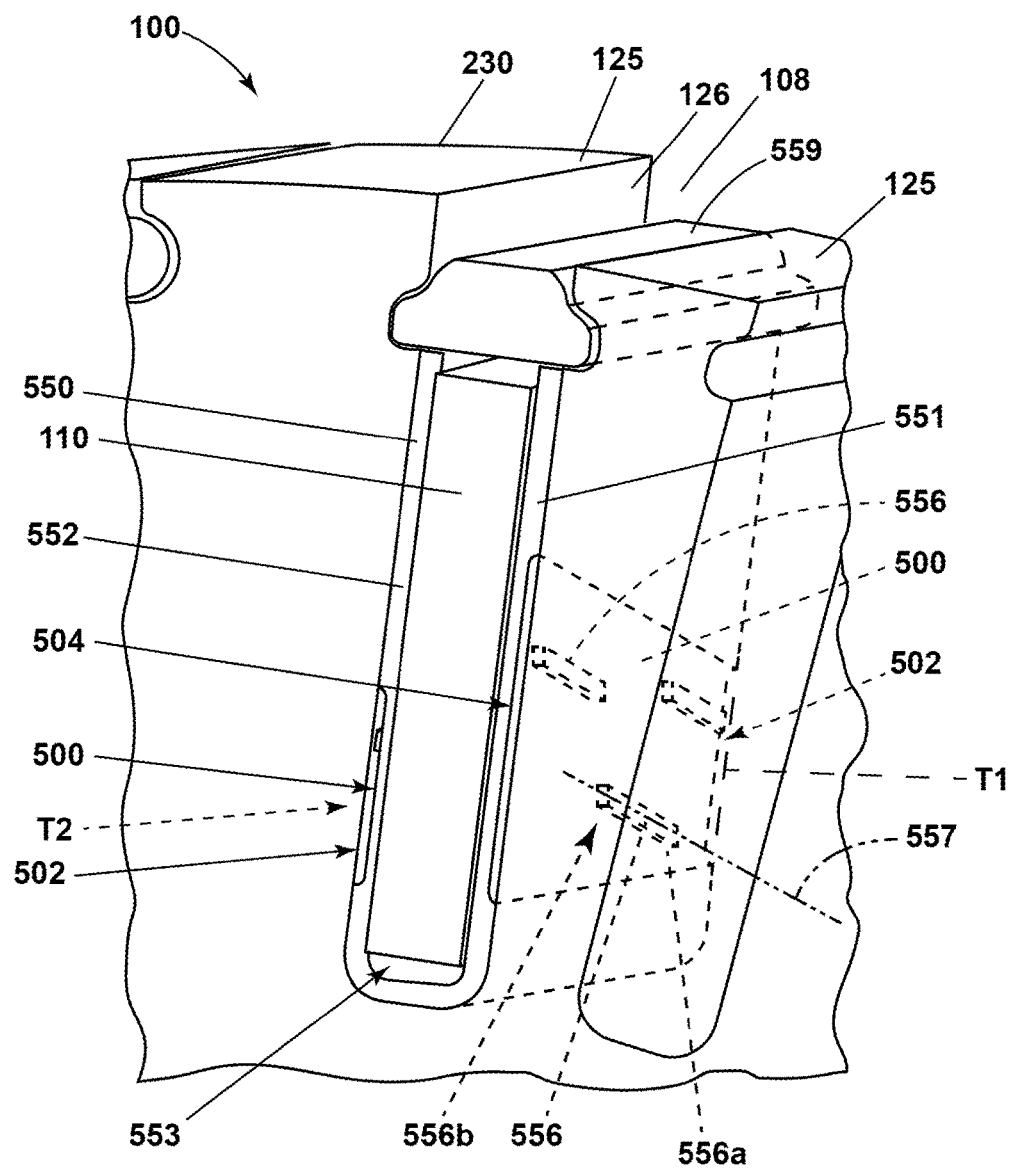

In non-limiting aspects, the rotor core conduits 500 can alternatively be formed using a duct member 550 disposed in the slot 108. FIG. 8 illustrates a perspective view of a portion of the rotor core 100 depicting a non-limiting aspect. As shown, the duct member 550 can be disposed in a respective slot 108 formed by a first rotor tooth 125 and an immediately adjacent second rotor tooth 125. Optionally, a wedge 559 or winding retainer can be disposed within the slot 108 to overlie the rotor winding 110. For example, in non-limiting aspects the duct member 550 can comprise a U-shaped member comprising a first leg 551 spaced apart from an opposing second leg 552 to define a gap 553 therebetween. In some aspects, a respective rotor winding 110 can be received in the gap 553. In non-limiting aspects, the first leg 551 can be arranged to face the first rotor tooth 125 and the second leg can be arranged to face the second rotor tooth 125. In non-limiting aspects, at least one of the first leg 551 and the second leg 552 can define a respective rotor core conduit 500. For example, in one non-limiting aspect, the first leg 551 and the first rotor tooth 125 can cooperatively define a first respective rotor core conduit 500 therebetween, and the second leg 552 and the second rotor tooth 125 can cooperatively define a second respective rotor core conduit 500 therebetween.

Regardless of whether a particular rotor core conduit 500 is defined the rotor core 100, or the duct member 550, or a combination thereof, in non-limiting aspects, the rotor core conduit 500 can further comprise a set of diverter ribs 556 or protrusions defined therein. For example, as illustrated in FIG. 8, the diverter ribs 556 can be formed as an elongate protrusion on the first leg 551, second leg 552, the rotor teeth 125, or a combination thereof. Each diverter rib 556 can comprise a first upstream end 556a, and a second downstream end 556b, defining a respective longitudinal axis 557 therebetween. The longitudinal axis 557 can extend for a portion of the axial length of the respective rotor core conduit 500. In various non-limiting aspects, each diverter rib 556 can have any desired length and any desired thickness. In non-limiting aspects, the longitudinal axis 557 of at least a subset of the diverter ribs 556 can be arranged at a non-parallel and non-orthogonal angle with respect to the rotational axis 41 of the rotatable shaft 40 or the first wall 515, or the second wall 516. For example, in non-limiting aspects, the first upstream end 556a of each diverter rib 556 in a particular rotor core conduit 500 can be disposed facing the respective rotor core conduit inlet 506, and the second downstream end 556b of the diverter rib 556 can be disposed facing the respective rotor core conduit outlet 507. Additionally, in such aspects, the first upstream end 556a of each diverter rib 556 in a respective rotor core conduit 500 can disposed relatively closer to the rotatable shaft 40 than the second downstream end 556b.

FIG. 9 illustrates a non-limiting aspect of a method 900 of fabricating an electric machine 14 in accordance with the disclosure herein. Non-limiting aspects of the method 900 can include, at 902, arranging a rotor assembly 96 comprising a rotor core 100 having cylindrical body having a first end 102 and an opposing second end 104, defining an axial length therebetween, and an outward facing or peripheral surface 230. The arranging the rotor assembly 96 can include, at 907, forming a set of rotor teeth 125 projecting outwardly from the peripheral surface 230 and extending along an axial length of the peripheral surface 230 to define a set of slots 108 therebetween. For example, each rotor tooth 125 can comprise a first rotor tooth wall 124, an opposing second rotor tooth wall 126, and a distal tip 125a disposed between the first rotor tooth wall 124 and second rotor tooth wall 126 such that each respective slot 108 is defined by a respective first rotor tooth wall 124 of a first rotor tooth 125, and a respective second rotor tooth wall 126 of a second rotor tooth 125.

The method 900 can further include at 915, defining a first rotor core conduit 500 within a respective slot 108. In some aspects, the first rotor core conduit 500 can be defined on the respective first rotor tooth wall 124 of the first rotor tooth 125, or a duct member 550, or both. The first rotor core conduit 500 can extend axially along an axial length of the first rotor tooth 125 and include a rotor core conduit first end 502 having a respective rotor core conduit inlet 506 facing the rotor assembly 96 first end 102, and a rotor core conduit second end 504 having a respective rotor core conduit outlet 507 facing the rotor assembly 96 second end 104. In aspects, the first rotor core conduit 500 can further comprise a first taper T1 that is narrower at the rotor core conduit first end 502 with respect to the rotor core conduit second end 504.

Optionally, in non-limiting aspects, the method 900 can include at 925 forming a first diverter rib 556 in the first rotor core conduit 500, having a first upstream end 556a and an opposing first downstream end 556b, the first upstream end 556a disposed facing the rotor core conduit inlet 506, and the first downstream end 556b disposed facing the rotor core conduit outlet 507, wherein the first upstream end 556a is disposed relatively closer to a center of the rotor core 100 than the first downstream end 556b. The method 900 can further include at 935, rotatably coupling the rotor core 100 to a rotatable shaft 40; and at 945 disposing a rotor winding 110 in the slot 108.

The method 900 can also include, at 950 fluidly coupling the first rotor core conduit 500 to a coolant conduit 150 of the electric machine 14.

The sequence depicted is for illustrative purposes only and is not meant to limit the method 400 in any way as it is understood that the portions of the method can proceed in a different logical order, additional or intervening portions can be included, or described portions of the method can be divided into multiple portions, or described portions of the method can be omitted without detracting from the described method.

A non-limiting aspect of the first coolant distribution ring 141 is depicted in FIG. 8 and FIG. 8A. In non-limiting aspects, the first coolant distribution ring 141 can comprise a generally annular member having an inwardly facing or first radially inner surface 146 and an opposing, outwardly facing or first radially outer surface 147. The first radially inner surface 146 can define a bore 148 sized to receive the rotatable shaft 40 therethrough and to receive a flow of coolant therefrom. As such, the first radially inner surface 146 can operatively define a coolant collection surface. In some aspects, the first radially inner surface 146 can be a relatively smooth surface. In other non-limiting aspects, the first radially inner surface 146 can define a set of channels or first grooves 149 thereon. The first grooves 149 can be arranged in fluid communication with the rotatable shaft 40. As such the set of first grooves 149 can cooperatively define a coolant reservoir.

The first coolant distribution ring 141 can further include a set of first channels 145 defined therethrough. In non-limiting aspects, the first channels 145 can be circumferentially spaced about the first coolant distribution ring 141. The first channels 145 can comprise respective longitudinal axes that extend radially through the first coolant distribution ring 141. The first channels 145 can be sized to allow a flow of cooling fluid therethrough. For example, each first channel 145 can extend radially from a first end 145a disposed at the first radially inner surface 146 to an opposing second end 145b at the first radially outer surface 147. Each first channel 145 can comprise a first coolant inlet 184 defined on the first radially inner surface 146, and a corresponding first coolant outlet 186 defined on the first radially outer surface 147, at the opposing second end 145b.

In operation, the first channels 145 can be in fluid communication with the rotatable shaft 40, or the set of first grooves 149, or both, to receive the flow of coolant therefrom. In non-limiting aspects, the first channels 145 can further be in fluid communication with a respective first coolant outlet 186. At least a subset of the coolant outlets 189 can define a respective spray nozzle 190 at a radially distal end. The spray nozzles 190 can be disposed at circumferentially spaced intervals on the first radially outer surface 147.

The first coolant distribution ring 141 can be fixedly coupled to the rotatable shaft 40 using one or more bolts, screws, pins, keys, or other known fasteners. In other non-limiting aspects, the first coolant distribution ring 141 can be coupled to the rotatable shaft 40 via an interference, friction, or press-fit engagement between the first coolant distribution ring 141 and the rotatable shaft 40. For example, the first radially inner surface 146 can be fixedly coupled to the rotatable shaft 40. Other aspects are not so limited, and it is contemplated that first coolant distribution ring 141 can be rotatably coupled to the rotatable shaft 40 by any desired affixing mechanisms. It will be appreciated that when so coupled, a rotation of the rotatable shaft 40 will result in rotation of the first coolant distribution ring 141.

In non-limiting aspects, the first coolant distribution ring 141 can further comprise a set of first tabs 153 extending radially therefrom. In some aspects, the first tabs 153 can be circumferentially spaced about the first coolant distribution ring 141. In some non-limiting aspects, the number of first tabs 153 can be equal to the number of poles of the generator 14. Other aspects are not so limited, and the first coolant distribution ring 141 can comprise any desired number of first tabs 153. For example, it will be appreciated that aspects as disclosed herein are not limited to any specific number of rotor poles, and aspects can be adapted to rotor assemblies 96 having any desired number of poles.

With reference back to FIG. 4, in non-limiting aspects, the first coolant distribution ring 141 can be disposed to at least partially underlie the rotor winding end turns 112. In this example, "underlie" denotes a relative position radially closer to the rotational axis 41 of the rotatable shaft 40. In non-limiting aspects, the first radially outer surface 147 can be arranged proximal to and facing the rotor winding end turns 112.

With continued reference to FIG. 4, in non-limiting aspects, the retaining ring 143 can at least partially overlie the rotor winding end turns 112. In this example, "overlie" denotes a relative position radially farther from the rotational axis 41 of the rotatable shaft 40.

In non-limiting aspects, the retaining ring 143 can be disposed to surround or enclose the first coolant distribution ring 141. For example, in non-limiting aspects, the retaining ring 143 can overlie or radially surround the first coolant distribution ring 141. In non-limiting aspects, the retaining ring 143 can optionally comprise a set of second tabs 167 extending radially therefrom. In some aspects, the second tabs 167 can be circumferentially spaced about the retaining ring 143. In non-limiting aspects, the number of second tabs 167 can be equal to the number of poles of the generator 14. Other aspects are not so limited, and the retaining ring 143 can comprise any desired number of second tabs 167.

The retaining ring 143 can be rigidly or fixedly coupled to the first coolant distribution ring 141. For example, the retaining ring 143 can be coupled to the first coolant distribution ring 141 using bolts or other fasteners disposed through the set of second tabs 167. In other non-limiting aspects, the retaining ring 143 can be coupled to the first coolant distribution ring 141 using bolts or other fasteners disposed through the set of first tabs 153. In still other non-limiting aspects the retaining ring 143 can be coupled to the first coolant distribution ring 141 using bolts or other fasteners disposed through both the set of first tabs 153 and the set of second tabs 167. When so coupled, the retaining ring 143 can limit or arrest an axial movement of the first coolant distribution ring 141. In aspects the retaining ring 143 and first coolant distribution ring 141 can cooperatively limit a radial deflection or relative movement of the rotor winding end turns 112.

In non-limiting aspects, the retaining ring 143 can be further arranged to surround the second coolant distribution ring 142. For example, the retaining ring 143 can be arranged be to at least partially overlie the second coolant distribution ring 142. In this example, "overlie" denotes a relative position radially farther from the rotational axis 41 of the rotatable shaft 40. In non-limiting aspects, the retaining ring 143 can comprise a radially inner surface 151 defining a central bore 175. The radially inner surface 151 can be disposed to face the radially outer surface 157 of the second coolant distribution ring 142.

A non-limiting aspect of the second coolant distribution ring 142 is depicted in FIG. 9. The second coolant distribution ring 142 can include an inwardly facing second radially inner surface 152 defining a central bore 155. The second coolant distribution ring 142 can further include outwardly facing, second radially outer surface 157 opposing the second radially inner surface 152. The second radially inner surface 152 can define a set of second grooves 158 and a set of third grooves 159. In nonlimiting aspects, the second grooves 158 can comprise an axially extending longitudinal axis. In aspects, the second grooves 158 can be circumferentially spaced from each other. The third grooves 159 can comprise a circumferentially extending longitudinal axis. The third grooves 159 can be axially spaced from each other. In non-limiting aspects, the second grooves 158 and third grooves 159 can be arranged at an angle with respect to each other. For example, as illustrated, in some aspects the second grooves 158 can be arranged orthogonally with respect to the third grooves 159. In other aspects the second grooves 158 can be arranged at any desired angle (i.e., non-parallel) with respect to the third grooves 159. In operation, the second grooves 158 and third grooves 159 of the second coolant distribution ring 142 can be arranged in fluid communication with the set of first grooves 149 of the first coolant distribution ring 141 to receive the fluid coolant flow 85 therefrom.

The second coolant distribution ring 142 can further define a set of second channels 172 extending therethrough. In non-limiting aspects, the second channels 172 can extend radially between the second radially inner surface 152 and the second radially outer surface 157. In some aspects, the second channels 172 can be circumferentially spaced from each other about the second coolant distribution ring 142. The second channels 172 can be in fluid communication with at least one of the set of second grooves 158 and the set of third grooves 159 to receive a flow of coolant therefrom. The second channels 172 can comprise a respective longitudinal axis that extends radially through the second coolant distribution ring 142. The second channels 172 can be sized to allow the fluid coolant flow 85 to flow therethrough. For example, each second channel 172 can extend radially from a first end 172a disposed at the second radially inner surface 152 to an opposing second end 172b disposed at the second radially outer surface 157. Each second channel 172 can comprise a second coolant inlet 173 defined on the first radially inner surface 146 in fluid communication with at least one of the set of second grooves 158 and the set of third grooves 159. Each second channel 172 can further comprise a corresponding second coolant outlet 174 defined on the second radially outer surface 157, at the opposing second end 172b.

With reference to FIG. 4, in non-limiting aspects, the second coolant distribution ring 142 can be disposed to at least partially overlie the rotor end turns 112 relative to a rotational axis of the rotor. The second coolant distribution ring 142 can be in fluid communication with the rotor winding end turns 112. In non-limiting aspects, the second coolant distribution ring 142 can be disposed radially between the rotor winding end turns 112 and the retaining ring 143. In non-limiting aspects, the second coolant distribution ring 142 can be disposed to underlie the retaining ring 143.

FIG. 10 depicts a non-limiting aspect of the coil support disc 144. In non-limiting aspects, the coil support disc 144 can comprise an annular member or disc having a first face 181 and an opposing second face 182. For example, the first face 181 can be axially inwardly facing, e.g. disposed to face the rotor core 100. In aspects, the second face 182 can be axially outwardly facing, e.g., disposed to face away from the rotor core 100. The coil support disc 144 can comprise a radially inwardly facing, or third radially inner surface 176 (i.e., facing the rotatable shaft 40) and an opposing radially outwardly facing, or third radially outer surface 177 (i.e., facing outward from the rotatable shaft 40). The third radially inner surface 176 and third radially outer surface 177 can be arranged between the first face 181 and second face 182.

In non-limiting aspects, the third radially outer surface 177 can define a set of notches 185 or gaps defined therethrough. The notches 185 can be circumferentially spaced from each other about the coil support disc 144. The notches 185 can be sized to operatively receive a respective rotor winding 110 axially therein. In this way, the coil support disc 144 can support, or otherwise limit a lateral movement of each rotor winding 110 disposed within a respective notch 185.

The third radially inner surface 176 can define a bore 178 sized to receive the rotatable shaft 40 therethrough. In non-limiting aspects, the third radially inner surface 176 can be arranged in fluid communication with the rotatable shaft 40 to receive a fluid coolant flow 85 therefrom. As such, the third radially inner surface 176 can operatively provide a coolant collection surface. In some aspects, the third radially inner surface 176 can be a relatively smooth surface. In other non-limiting aspects, the third radially inner surface 176 can define a set of fourth grooves 179 or notches thereon. The third radially inner surface 176 or the fourth grooves 179 or both, can be in fluid communication with the rotatable shaft 40. As such, third radially inner surface 176 or the fourth grooves 179 or both, can operatively provide a coolant reservoir.

The coil support disc 144 can further include a set of third channels 183 defined therethrough. In non-limiting aspects, at least a portion of the third channels 183 can be circumferentially spaced from each other about the coil support disc 144. Each third channel 183 can define a respective path extending radially through the coil support disc 144. In some non-limiting aspects, a fourth channel 187 can be defined in fluid communication with at least a subset of the third channels 183. In this sense, at least a subset of the third channels 183 can be in fluid communication with each other via the fourth channel 187. For example, the fourth channel 187 can be arranged to extend circumferentially about the coil support disc 144 and coupled to at least a subset of the third channels 183. The third channels 183 and fourth channel 187 can be sized to allow a flow of cooling fluid therethrough. At least a subset of the third channels 183 can extend or traverse from a first end 183a at the third radially inner surface 176 to an opposing second end 183b. In non-limiting aspects the second end 183b can be disposed at the third radially outer surface 177. For example, the second end 183b can be disposed within a respective notch 185. In this sense, the third radially inner surface 176 can be in fluid communication with the set of notches 185 via the set of third channels 183. It will be appreciated that because the third radially inner surface 176 and set of third channels 183 can be in fluid communication with the set of notches 185, the third radially inner surface 176 and set of third channels 183 can further be in fluid communication with the respective winding 110 disposed in the respective notch 185. In other non-limiting aspects, the second end 183b can be disposed on the first face 181. Each third channel 183 can comprise a third coolant inlet 188. In non-limiting aspects, the third coolant inlet 188 can be defined on the first radially inner surface 146. In some aspects, each third channel 183 can further comprise a respective third coolant outlet 189 at the opposing second end 183b. In non-limiting aspects, the respective third coolant outlet 189 can be defined on the first face 181, on the third radially outer surface 177, or combinations thereof. For example, in non-limiting aspects, the third coolant outlet 189 can be defined within a respective notch 185. In some aspects, the third coolant outlets 189 can be disposed at circumferentially spaced intervals on the first face 181. In aspects, the second channels 172 can be in fluid communication with the rotatable shaft 40, or the set of first grooves 149, or both, to receive the fluid coolant flow 85 therefrom. In this way, the fluid coolant flow 85 can be operatively centrifugally conveyed from the third radially inner surface 176 to the set of third channels 183 and to the third coolant outlets 189. In non-limiting aspects, the fluid coolant flow 85 through the set of third channels 183 can be in parallel with the fluid coolant flow 85 through the first coolant distribution ring 141, or the second coolant distribution ring 142, or both.

For example, in non-limiting aspects, the third channels 183 can be disposed proximal to and in fluid communication with the rotor core conduits 500 to provide the fluid coolant flow 85 thereto.

The coil support disc 144 can be fixed to the rotatable shaft 40 using one or more bolts, screws, pins, keys, or other known fasteners. In other non-limiting aspects, the coil support disc 144 can be coupled to the rotatable shaft 40 via an interference, friction, or press-fit engagement between the coil support disc 144 and the rotatable shaft 40. Other aspects are not so limited, and it is contemplated that the coil support disc 144 can be rotatably coupled to the rotatable shaft 40 by any desired affixing mechanisms. It will be appreciated that when so coupled, a rotation of the rotatable shaft 40 will result in rotation of the first coolant distribution ring 141.

In non-limiting aspects, the coil support disc 144 can be operatively disposed between the rotor core 100 and the first coolant distribution ring 141. For example, in non-limiting aspects, the coil support disc 144 can be disposed within one or more of the channels 116 defined by the rotor winding end turns 112.

FIG. 11 illustrates a portion of the rotor assembly 96 of FIG. 4 for better understanding the cooling system 80 and fluid coolant flow 85 from the rotatable shaft 40 to the set of rotor winding end turns 112 and the set of stator winding end turns 92. As will be described in more detail herein, the fluid coolant flow 85 can be channeled or conveyed to the rotor winding end turns 112 via the first coolant distribution ring 141, or the end coil support disc 144, or both.

The rotatable shaft 40 defines a first coolant conduit 150 fluidly connected with a source of coolant 165. The source of coolant 165 can be, but is not limited to the cooling fluid inlet port (not shown). The direction or location of the source of coolant 165 is not limited by the illustration and can be considered in any location that is fluidly coupled to the first coolant conduit 150. It is further considered that additional conduit, pumps, valves, or other devices can be included to fluidly connect the source of coolant 165 and the first coolant conduit 150.

Fluid can enter the rotatable shaft 40 of the rotor assembly 96 via the inlet port 82. The rotatable shaft 40 at least in part, can define the first coolant conduit 150, through which fluid can flow radially outward from the rotational axis 41 due to the centrifugal force effects of the rotatable shaft 40. A first radial coolant passage 154, by way of extending radially through the rotatable shaft 40, can fluidly couple the first coolant conduit 150 and the first coolant distribution ring 141.

The first coolant distribution ring 141 can receive the coolant fluid from the first radial coolant passage 154 via the first radially inner surface 146. For example, the coolant fluid can collect or accumulate in the set of first grooves 149 defined on the first radially inner surface 146, and then be centrifugally conveyed to the first channels 145, and to a respective first coolant outlet 186. The first coolant outlets 186 can comprise a respective spray nozzle 190 at a radially distal end. The spray nozzles 190 can be directed to provide a flow of coolant fluid radially outwardly therefrom.

In some non-limiting aspects, a first cavity 161 can be cooperatively defined by the rotatable shaft 40, or the first coolant distribution ring 141, or both, and the rotor winding end turns 112. The first cavity 161 can underlie at least a portion of the rotor winding end turns 112. For example, in non-limiting aspects, each first cavity 161 can be defined between the rotor winding end turns 112 and the first radially outer surface 147. In aspects, each first cavity 161 can be disposed relative to and underlying one of the sets of rotor winding end turns 112

In some non-limiting aspects, a second cavity 162 can be cooperatively defined by the second radially outer surface 157 of the second coolant distribution ring 142, and the retaining ring 143. In some aspects, the second cavity 162 can be coupled in fluid communication with the second channels 172 of the second coolant distribution ring 142 to operatively receive the fluid coolant flow 85 therefrom.

In non-limiting aspects, a gap or coolant outlet 163 can cooperatively be defined by the coil support assembly 140 and the rotor core 100. In non-limiting aspects, the coolant outlet 163 can be in fluid communication with the set of second channels 172 of the second coolant distribution ring 142. The coolant outlet 163 can be disposed at an outer circumference 164 of the rotor assembly 96. Optionally, the coolant outlet 163 can be a nozzle 166 configured to direct coolant toward the set of stator windings 90 or the set of stator winding end turns 92. The coolant outlet 163 or the nozzle 166 can be at least partially defined by, in contact with, or coupled to an insulating layer 128 located axially between at least part of the rotor core 100 and the coil support disc 144.

As shown, the rotor winding end turns 112 can include a set of radial rotor end turn passages 156. As used herein, the set of radial rotor end turn passages 156 refers to a set of radially extending passages between the rotor windings 110 that can fluidly couple the first cavity 161 to the second coolant distribution ring 142 or the second cavity 162 or both. For example, in non-limiting aspects, the rotor end turn passages 156 can include the respective channel 116 extending through a bight portion 113 defined by a respective rotor winding end turn 112

In one non-limiting example, the first cavity 161 can be configured to overlie the coolant fluid output volume from the first radial coolant passage 154, the set of spray nozzles 190, or both, such that fluid expelled from the first radial coolant passage 154 or set of spray nozzles 190 is received by the first cavity 161. The first cavity 161, can be configured to limit or restrict where fluid received from the first radial coolant passage 154 or set of spray nozzles 190 traverses radially, axially, or a combination thereof, such that the fluid is reliably delivered radially from the first cavity 161 to the rotor winding end turns 112 or the radial rotor end turn passages 156, and then to the second coolant distribution ring 142 via the second cavity 162.

The set of second grooves 158 and the set of third grooves 159 of the second coolant distribution ring 142 can be in fluid communication with the radial rotor end turn passages 156 to receive the fluid coolant flow 85 therefrom. In operation, the coolant fluid can be centrifugally conveyed from the second grooves 158 and third grooves 159 to the set of second channels 172 and to the respective second coolant outlet 174. The coolant fluid can then be conveyed toward the coolant outlet 163, via the second cavity 162, such as in an axially inward direction (e.g., toward the rotor core 100), to the coolant outlet 163.

The coolant outlet 163 can receive the fluid coolant flow 85 from one or more second channels 172 via the second cavity 162. For example, in non-limiting aspects, the second cavity 162 can be in fluid communication with the coolant outlet 163 via the radially inner surface 151 such that the rotation of the rotatable shaft 40 about the rotational axis 41 radially expels the fluid coolant flow 85 past the rotor winding end turns 112 and radially outward from the rotor assembly 96.

Additionally, in non-limiting aspects, the coil support disc 144 can receive the coolant fluid from the first radial coolant passage 154 via the third radially inner surface 176. For example, the coolant fluid can collect or accumulate in the one or more fourth grooves 179. In operation, the coolant fluid can be centrifugally conveyed from the one or more fourth grooves 179 to the set of third channels 183 and to the respective coolant outlet 189. In non-limiting aspects, at least a subset of the coolant outlets 189 can be in fluid communication with a respective notch 185 and the rotor winding end turn 112 disposed therein. In some non-limiting aspects, at least a subset of the coolant outlets 189 can be in fluid communication with a respective slot 108 defined in the rotor core 100. During operation of the generator 14, the rotation of the magnetic field generated by the set of main machine rotor windings 110 relative to the set of main machine stator windings 90 generates electricity in the main machine stator windings 90. This magnetic interaction further generates heat in the set of main machine rotor windings 110 and main machine stator windings 90. In accordance with aspects described herein, coolant fluid can enter the rotatable shaft 40 of the rotor assembly 96 via the inlet port 82. The rotatable shaft 40 at least in part, can define the first coolant conduit 150, through which fluid can flow radially outward from the rotational axis 41. Fluid from the first coolant conduit 150 can pass through the first radial coolant passage 154 to be radially received by the coil support disc 144 to be radially received at the notches 185 defined thereon and in contact with the rotor windings 110 disposed in the notches 185. This contacting can remove heat from the rotor windings 110 into the coolant. The coolant can then be expelled axially into passages defined in the rotor core 100. Additionally, or alternatively, fluid from the first coolant conduit 150 can pass through the first radial coolant passage 154 to be radially received by the first coolant distribution ring 141 and distributed to the first cavity 161. Fluid can continue to flow radially outward through the first cavity 161 and through the radial rotor end turn passages 156 that pass between the rotor windings 110 to thereby transfer heat from the set of main machine rotor windings 110 into the coolant by conduction. The coolant can be radially expelled from radial rotor end turn passages 156 into the second cavity 162, where it further can collect at the radially inner surface 151. The radially inner surface 151 can redirect the fluid coolant flow 85 to the coolant outlet 163, where it is further radially expelled outward to contact the set of main machine stator windings 90. This contacting further removes heat from the main machine stator windings 90 into the coolant.

The aspects disclosed herein provide method and apparatus for cooling a set of rotor windings or a set of rotor winding end turns during electric machine operations (e.g. motor or generator operations). One advantage that may be realized in the above aspects is that the above described aspects have significantly improved thermal conduction to remove heat from the set of rotor windings or the set of rotor winding end turns. The improved thermal conductivity between the set of rotor winding end turns and the coolant conduits coupled with the coolant channels provide for heat removal in a much more effective fashion from the rotor winding end turns to the coolant.

The aspects disclosed herein provide method and apparatus for cooling a set of rotor windings or a set of rotor winding end turns during electric machine operations (e.g. motor or generator operations). One advantage that may be realized in the above aspects is that the above described aspects have significantly improved thermal conduction to remove heat from the set of rotor windings or the set of rotor winding end turns. The improved thermal conductivity between the set of rotor winding end turns and the coolant conduits coupled with the coolant channels provide for heat removal in a much more effective fashion from the rotor winding end turns to the coolant.

The increased thermal dissipation of the rotor winding end turns allows for a higher speed rotation, which may otherwise generate too much heat. The higher speed rotation may result in improved power generation or improved generator efficiency without increasing generator size. The described aspects having the fluid channels for the wet cavity machine are also capable of cooling the stator windings or end turn segments which further reduces thermal losses of the electric machine. Reduced thermal losses in the electric machine allows for greater efficiency and greater power density of the generator.

When designing aircraft components, reliability is also informant feature. The above described end assembly can provide additional physics stability and improved cooling to the rotor winding end turns. The stability and cooling provided by the end support allow an increase in performance and reliability.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Many other possible aspects and configurations in addition to that shown in the above figures are contemplated by the present disclosure. Additionally, the design and placement of the various components such as valves, pumps, or conduits can be rearranged such that a number of different in-line configurations could be realized.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. Further aspects of the invention are provided by the subject matter of the following clauses:

1. A rotor assembly for an electric machine comprising: a rotor core comprising a body having a first end and an opposing second end, and an outwardly facing peripheral surface; a set of rotor teeth projecting outwardly from the peripheral surface and defining a set of rotor slots therebetween, each rotor tooth comprising a first rotor tooth wall, an opposing second rotor tooth wall, and a distal tip disposed between the first rotor tooth wall and second rotor tooth wall; each respective rotor slot being defined by a respective first rotor tooth wall of a first rotor tooth, and a respective second rotor tooth wall of a second rotor tooth, and operative to receive a rotor winding therein, each rotor slot comprising a first rotor core conduit extending axially along a length of the first rotor tooth; and wherein the first rotor core conduit comprises a first rotor core conduit inlet at the rotor core first end and a first rotor core conduit outlet at the rotor core second end, the first rotor core conduit defining a first taper that is narrower at the first rotor core conduit inlet with respect to the first rotor core conduit inlet.
2. The rotor assembly of any preceding clause, wherein each respective rotor slot further comprises a second rotor core conduit extending axially along a length of the second rotor tooth.
3. The rotor assembly of any preceding clause, wherein the second rotor core conduit comprises a second rotor conduit inlet at the rotor core first end and a second rotor core conduit outlet at the rotor core second end, the second rotor core conduit having the first taper.
4. The rotor assembly of any preceding clause, wherein the second rotor core conduit comprises a second rotor core conduit inlet at the rotor core second end and a second rotor core conduit outlet at the rotor core first end, the second rotor core conduit defining a second taper that is narrower at the second rotor core conduit inlet than the second rotor core conduit outlet.
5. The rotor assembly of any preceding clause, further comprising a fluid coolant flow through the rotor core in a first axial direction in the first rotor core conduit, and in a second axial direction opposite the first axial direction in the second rotor core conduit.
6. The rotor assembly of any preceding clause, wherein the first rotor core conduit comprises a first diverter rib having a first upstream end and an opposing first downstream end, the first upstream end disposed facing the first rotor core conduit inlet, and the first downstream end disposed facing the first rotor core conduit inlet, wherein the first upstream end is further disposed relatively closer to a center axis (CP) of the rotor core than the first downstream end.
7. The rotor assembly of any preceding clause, wherein the second rotor core conduit comprises a second diverter rib having a second upstream end and an opposing second downstream end, the second upstream end disposed facing the second rotor core conduit inlet, and the second downstream end disposed facing the second rotor core conduit outlet, wherein the second upstream end is further disposed relatively closer to a center axis (of the rotor core than the second downstream end.
8. The rotor assembly of any preceding clause, wherein the second rotor core conduit comprises a second diverter rib having a second upstream end and an opposing second downstream end, the second upstream end disposed facing the second rotor core conduit inlet, and the second downstream end disposed facing the second rotor core conduit outlet, wherein the second upstream end is further disposed relatively closer to a center axis of the rotor core than the second downstream end.
9. The rotor assembly of any preceding clause, wherein the first rotor core conduit comprises a first diverter rib having a first upstream end and an opposing first downstream end, the first upstream end disposed facing the first rotor core conduit inlet, and the first downstream end disposed facing the first rotor core conduit outlet, wherein the first upstream end is further disposed relatively closer to a center axis of the rotor core than the first downstream end; and wherein each respective rotor slot further comprises a second rotor core conduit extending axially along a length of the second rotor tooth, the second rotor core conduit having a second inlet at the rotor core second end and a second rotor core conduit outlet at the rotor core first end, the second rotor core conduit defining a second taper that is narrower at the second rotor core conduit inlet than the second rotor core conduit outlet, the second rotor core conduit further comprising a second diverter rib having a second upstream end and an opposing second downstream end, the second upstream end disposed facing the rotor core conduit second inlet, and the second downstream end disposed facing the second rotor core conduit outlet, wherein the second upstream end is further disposed relatively closer to a center axis of the rotor core than the second downstream end.
10. The rotor assembly of any preceding clause, further comprising a fluid coolant flow through the rotor core in a first axial direction the first rotor core conduit, and in a second axial direction opposite the first axial direction in the second rotor core conduit.
11. The rotor assembly of any preceding clause, wherein the first rotor core conduit is defined by at least one of the first rotor tooth and a duct member disposed in the respective rotor slot.
12. An electric machine comprising: a rotatable shaft; a rotor assembly rotatably coupled to the rotatable shaft, the rotor assembly comprising: a rotor core comprising a cylindrical body having a first end and an opposing second end, and an outwardly facing peripheral surface; a set of rotor teeth projecting outwardly from the peripheral surface defining a set of rotor slots therebetween, each rotor tooth comprising a first rotor tooth wall, an opposing second rotor tooth wall, and a distal tip disposed between the first rotor tooth wall and second rotor tooth wall; each respective rotor slot being defined by a respective first rotor tooth wall of a first rotor tooth, and a respective second rotor tooth wall of a second rotor tooth, and operative to receive a rotor winding therein, each rotor slot comprising a first rotor core conduit extending axially along a length of the first rotor tooth; the first rotor core conduit comprising a first rotor core conduit inlet at the rotor core first end and a first rotor core conduit outlet at the rotor core second end, the first rotor core conduit defining a first taper that is narrower at the first rotor core conduit inlet than the first rotor core conduit outlet; and a rotor winding disposed in the rotor slot.
13. The electric machine of any preceding clause, wherein each respective rotor slot further comprises a second rotor core conduit extending axially along a length of the second rotor tooth.
14. The electric machine of any preceding clause, wherein the second rotor core conduit comprises a second rotor core conduit inlet at the rotor core first end and a second rotor core conduit outlet at the rotor core second end, the second rotor core conduit having the first taper.

15. The electric machine of any preceding clause, further comprising a fluid coolant flow through the rotor assembly in a first axial direction in the first rotor core conduit, and in a second axial direction, opposite the first axial direction, in the second rotor core conduit.
16. The electric machine of any preceding clause, wherein the first rotor core conduit is defined by at least one of the first rotor tooth and a duct member disposed in the respective rotor slot.
17. The electric machine of any preceding clause, wherein the first rotor core conduit comprises a first diverter rib having a first upstream and an opposing first downstream end, the first upstream end disposed facing the first rotor core conduit inlet, and the first downstream end disposed facing the first rotor core conduit inlet, wherein the first upstream end is further disposed relatively closer to a center axis of the rotor core than the first downstream end.
18. A method of fabricating an electric machine comprising: arranging a rotor core comprising a cylindrical body having a first end and an opposing second end, and an outwardly facing peripheral surface; forming a set of rotor teeth projecting outwardly from the peripheral surface to define a set of rotor slots therebetween, each rotor tooth comprising a first rotor tooth wall, an opposing second rotor tooth wall, and a distal tip disposed between the first rotor tooth wall and second rotor tooth wall such that each respective rotor slot is defined by a respective first rotor tooth wall of a first rotor tooth, and a respective second rotor tooth wall of a second rotor tooth; defining a first rotor core conduit within a respective rotor slot extending axially along a length of the first rotor tooth, comprising a first rotor core conduit inlet at the rotor core first end and a first rotor core conduit outlet at the rotor core second end, the first rotor core conduit comprising a first taper that is narrower first rotor core conduit inlet than the first rotor core conduit outlet; coupling the rotor core to a rotatable shaft; and disposing a rotor winding in the rotor slot.
19. The method of any preceding clause, further comprising forming a first diverter rib in the first rotor core conduit, having a first upstream end and an opposing first downstream end, the first upstream end disposed facing the first rotor core conduit inlet, and the first downstream end disposed facing the first rotor core conduit inlet, wherein the first upstream end is further disposed relatively closer to a center axis (CP) of the rotor core than the first downstream end.
20. The method of any preceding clause, further comprising fluidly coupling the first rotor core conduit to a cooling fluid reservoir of the electric machine.

What is claimed is:
1. A rotor assembly for an electric machine comprising:
a rotor core comprising a body having a first end and an opposing second end, and an outwardly facing peripheral surface;
a set of rotor teeth projecting outwardly from the peripheral surface and defining a set of rotor slots therebetween, each rotor tooth comprising a first rotor tooth wall, an opposing second rotor tooth wall, and a distal tip disposed between the first rotor tooth wall and second rotor tooth wall;
each respective rotor slot being defined by a respective first rotor tooth wall of a first rotor tooth, and a respective second rotor tooth wall of a second rotor tooth, and operative to receive a rotor winding therein, each rotor slot comprising a first rotor core conduit extending axially along a length of the first rotor tooth; and
wherein the first rotor core conduit comprises a first rotor core conduit inlet at the rotor core first end and a first rotor core conduit outlet at the rotor core second end, the first rotor core conduit defining a first taper that is narrower at the first rotor core conduit inlet with respect to the first rotor core conduit outlet.

2. The rotor assembly of claim 1, wherein each respective rotor slot further comprises a second rotor core conduit extending axially along a length of the second rotor tooth.
3. The rotor assembly of claim 2, wherein the second rotor core conduit comprises a second rotor core conduit inlet at the rotor core first end and a second rotor core conduit outlet at the rotor core second end, the second rotor core conduit having the first taper.
4. The rotor assembly of claim 3, wherein the second rotor core conduit comprises a second diverter rib having a second upstream end and an opposing second downstream end, the second upstream end disposed facing the second rotor core conduit inlet, and the second downstream end disposed facing the second rotor core conduit outlet, wherein the second upstream end is further disposed relatively closer to a center axis of the rotor core than the second downstream end.
5. The rotor assembly of claim 2, wherein the second rotor core conduit comprises a second rotor core conduit inlet at the rotor core second end and a second rotor core conduit outlet at the rotor core first end, the second rotor core conduit defining a second taper that is narrower at the second rotor core conduit inlet than the second rotor core conduit outlet.
6. The rotor assembly of claim 5, further comprising a fluid coolant flow through the rotor core in a first axial direction in the first rotor core conduit, and in a second axial direction opposite the first axial direction in the second rotor core conduit.
7. The rotor assembly of claim 5, wherein the second rotor core conduit comprises a second diverter rib having a second upstream end and an opposing second downstream end, the second upstream end disposed facing the second rotor core conduit inlet, and the second downstream end disposed facing the second rotor core conduit outlet, wherein the second upstream end is further disposed relatively closer to a center axis of the rotor core than the second downstream end.
8. The rotor assembly of claim 1, wherein the first rotor core conduit comprises a first diverter rib having a first upstream end and an opposing first downstream end, the first upstream end disposed facing the first rotor core conduit inlet, and the first downstream end disposed facing the first rotor core conduit inlet, wherein the first upstream end is further disposed relatively closer to a center axis of the rotor core than the first downstream end.
9. The rotor assembly of claim 1, wherein the first rotor core conduit comprises a first diverter rib having a first upstream end and an opposing first downstream end, the first upstream end disposed facing the first rotor core conduit inlet, and the first downstream end disposed facing the first rotor core conduit outlet, wherein the first upstream end is further disposed relatively closer to a center axis of the rotor core than the first downstream end; and
wherein each respective rotor slot further comprises a second rotor core conduit extending axially along a length of the second rotor tooth, the second rotor core conduit having a second inlet at the rotor core second end and a second rotor core conduit outlet at the rotor core first end, the second rotor core conduit defining a second taper that is narrower at the second rotor core conduit inlet than the second rotor core conduit outlet, the second rotor core conduit further comprising a second diverter rib having a second upstream end and an opposing second downstream end, the second upstream end disposed facing the rotor core conduit second inlet, and the second downstream end disposed facing the second rotor core conduit outlet, wherein the second upstream end is further disposed relatively closer to a center axis of the rotor core than the second downstream end.

10. The rotor assembly of claim 9, further comprising a fluid coolant flow through the rotor core in a first axial direction the first rotor core conduit, and in a second axial direction opposite the first axial direction in the second rotor core conduit.

11. The rotor assembly of claim 1, wherein the first rotor core conduit is defined by at least one of the first rotor tooth and a duct member disposed in the respective rotor slot.

12. An electric machine comprising:
   a rotatable shaft;
   a rotor assembly rotatably coupled to the rotatable shaft, the rotor assembly comprising:
      a rotor core comprising a cylindrical body having a first end and an opposing second end, and an outwardly facing peripheral surface;
      a set of rotor teeth projecting outwardly from the peripheral surface defining a set of rotor slots therebetween, each rotor tooth comprising a first rotor tooth wall, an opposing second rotor tooth wall, and a distal tip disposed between the first rotor tooth wall and second rotor tooth wall;
      each respective rotor slot being defined by a respective first rotor tooth wall of a first rotor tooth, and a respective second rotor tooth wall of a second rotor tooth, and operative to receive a rotor winding therein, each rotor slot comprising a first rotor core conduit extending axially along a length of the first rotor tooth;
      the first rotor core conduit comprising a first rotor core conduit inlet at the rotor core first end and a first rotor core conduit outlet at the rotor core second end, the first rotor core conduit defining a first taper that is narrower at the first rotor core conduit inlet than the first rotor core conduit outlet; and
      a rotor winding disposed in the rotor slot.

13. The electric machine of claim 12, wherein each respective rotor slot further comprises a second rotor core conduit extending axially along a length of the second rotor tooth.

14. The electric machine of claim 13, wherein the second rotor core conduit comprises a second rotor core conduit inlet at the rotor core first end and a second rotor core conduit outlet at the rotor core second end, the second rotor core conduit having the first taper.

15. The electric machine of claim 14, further comprising a fluid coolant flow through the rotor assembly in a first axial direction in the first rotor core conduit, and in a second axial direction, opposite the first axial direction, in the second rotor core conduit.

16. The electric machine of claim 13, wherein the first rotor core conduit is defined by at least one of the first rotor tooth and a duct member disposed in the respective rotor slot.

17. The electric machine of claim 12, wherein the first rotor core conduit comprises a first diverter rib having a first upstream and an opposing first downstream end, the first upstream end disposed facing the first rotor core conduit inlet, and the first downstream end disposed facing the first rotor core conduit inlet, wherein the first upstream end is further disposed relatively closer to a center axis of the rotor core than the first downstream end.

18. A method of fabricating an electric machine comprising:
   arranging a rotor core comprising a cylindrical body having a first end and an opposing second end, and an outwardly facing peripheral surface;
   forming a set of rotor teeth projecting outwardly from the peripheral surface to define a set of rotor slots therebetween, each rotor tooth comprising a first rotor tooth wall, an opposing second rotor tooth wall, and a distal tip disposed between the first rotor tooth wall and second rotor tooth wall such that each respective rotor slot is defined by a respective first rotor tooth wall of a first rotor tooth, and a respective second rotor tooth wall of a second rotor tooth;
   defining a first rotor core conduit within a respective rotor slot extending axially along a length of the first rotor tooth, comprising a first rotor core conduit inlet at the rotor core first end and a first rotor core conduit outlet at the rotor core second end, the first rotor core conduit comprising a first taper that is narrower at the first rotor core conduit inlet than the first rotor core conduit outlet;
   coupling the rotor core to a rotatable shaft; and
   disposing a rotor winding in the rotor slot.

19. The method of claim 18, further comprising forming a first diverter rib in the first rotor core conduit, having a first upstream end and an opposing first downstream end, the first upstream end disposed facing the first rotor core conduit inlet, and the first downstream end disposed facing the first rotor core conduit inlet, wherein the first upstream end is further disposed relatively closer to a center axis (CP) of the rotor core than the first downstream end.

20. The method of claim 18, further comprising fluidly coupling the first rotor core conduit to a cooling fluid reservoir of the electric machine.

* * * * *